United States Patent
Wagner et al.

(10) Patent No.: US 9,714,305 B2
(45) Date of Patent: Jul. 25, 2017

(54) MULTIPLE CATALYST SYSTEM COMPRISING METALLOCENES AND TRIDENTATE NITROGEN BASED LIGAND COMPLEXES FOR OLEFIN POLYMERISATION

(71) Applicant: Univation Technologies, LLC, Houston, TX (US)

(72) Inventors: Juliet B. Wagner, Houston, TX (US); Garth R. Giesbrecht, Houston, TX (US); Sun-Chueh Kao, Houston, TX (US); Stephen P. Jaker, Woodbridge, NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 14/775,807

(22) PCT Filed: Feb. 21, 2014

(86) PCT No.: PCT/US2014/017670
§ 371 (c)(1),
(2) Date: Sep. 14, 2015

(87) PCT Pub. No.: WO2014/149360
PCT Pub. Date: Sep. 25, 2014

(65) Prior Publication Data
US 2016/0024238 A1 Jan. 28, 2016

Related U.S. Application Data

(60) Provisional application No. 61/790,681, filed on Mar. 15, 2013.

(51) Int. Cl.
*C08F 4/76* (2006.01)
*C08F 4/64* (2006.01)
*C08F 210/16* (2006.01)
*C08F 10/00* (2006.01)
*C08F 4/659* (2006.01)

(52) U.S. Cl.
CPC ............ *C08F 210/16* (2013.01); *C08F 10/00* (2013.01); *B01J 2531/0238* (2013.01); *C08F 4/65908* (2013.01); *C08F 4/65912* (2013.01); *C08F 4/65916* (2013.01)

(58) Field of Classification Search
CPC .... C08F 4/62141; C08F 4/64141; C08F 4/76; C08F 4/64; C08F 210/16; C08F 2500/05; B01J 31/38; B01J 2531/0244
See application file for complete search history.

(56) References Cited

U.S. PATENT DOCUMENTS

| | | | | |
|---|---|---|---|---|
| 5,889,128 A * | 3/1999 | Schrock | ............... | C07C 217/08 502/150 |
| 6,271,325 B1 * | 8/2001 | McConville | .......... | C07C 211/65 502/167 |
| 6,300,439 B1 * | 10/2001 | McConville | ............ | C08F 10/00 526/127 |
| 6,316,555 B1 * | 11/2001 | Schrock | ............... | C07C 217/08 502/150 |
| 6,610,806 B2 * | 8/2003 | Schrock | ............... | C07C 217/08 502/150 |
| 8,435,914 B2 * | 5/2013 | Kao | ........................ | C08F 10/00 502/113 |
| 2011/0118417 A1 | 5/2011 | Liu et al. | | |
| 2012/0046428 A1 | 2/2012 | Kao et al. | | |

FOREIGN PATENT DOCUMENTS

| | | |
|---|---|---|
| CN | 135615 | 5/2002 |
| CN | 1566163 | 1/2005 |
| CN | 101880338 | 11/2010 |
| WO | 0130860 | 5/2001 |

OTHER PUBLICATIONS

International Search Report and Written Opinion for related PCT Application PCT/US2014/017670, mailed Jun. 17, 2014 (14 pgs).

* cited by examiner

*Primary Examiner* — Rip A Lee
(74) *Attorney, Agent, or Firm* — Brooks, Cameron & Huebsch, PLLC

(57) ABSTRACT

Catalyst systems and methods for making and using the same are described herein. A catalyst system can include at least three catalysts. The three catalysts include a metallocene catalyst, a first non-metallocene including a ligand complexed to a metal through two or more nitrogen atoms, and a second non-metallocene including a ligand complexed to a metal through one or more nitrogen atoms and an oxygen atom.

9 Claims, 4 Drawing Sheets

200

MULTIPLE CATALYST SYSTEM COMPRISING METALLOCENES AND TRIDENTATE NITROGEN BASED LIGAND COMPLEXES FOR OLEFIN POLYMERISATION

This application is a National Stage Application under 35 U.S.C. §371 of International Application Number PCT/US2014/017670, filed Feb. 21, 2014 and published as WO 2014/149360 on Sep. 25, 2014, which claims the benefit to U.S. Provisional Application 61/790,681, filed Mar. 15, 2013, the entire contents of which are incorporated herein by reference in its entirety.

BACKGROUND

Ethylene alpha-olefin (polyethylene) copolymers are typically produced in a low pressure reactor, utilizing, for example, solution, slurry, or gas phase polymerization processes. Polymerization takes place in the presence of catalyst systems such as those employing, for example, a Ziegler-Natta catalyst, a chromium based catalyst, a metallocene catalyst, or combinations thereof.

A number of catalyst compositions containing single site, e.g., metallocene, catalysts have been used to prepare polyethylene copolymers, producing relatively homogeneous copolymers at good polymerization rates. In contrast to traditional Ziegler-Natta catalyst compositions, single site catalyst compositions, such as metallocene catalysts, are catalytic compounds in which each catalyst molecule contains one or only a few polymerization sites. Single site catalysts often produce polyethylene copolymers that have a narrow molecular weight distribution. Although there are single site catalysts that can produce broader molecular weight distributions, these catalysts often show a narrowing of the molecular weight distribution (MWD) as the reaction temperature is increased, for example, to increase production rates. Further, a single site catalyst will often incorporate comonomer among the molecules of the polyethylene copolymer at a relatively uniform rate.

It is generally known in the art that a polyolefin's MWD will affect the different product attributes. Polymers having a broad molecular weight distribution may have improved physical properties, such as stiffness, toughness, processibility, and environmental stress crack resistance (ESCR), among others.

To achieve these properties, bimodal polymers have become increasingly important in the polyolefins industry, with a variety of manufacturers offering products of this type. Whereas older technology relied on two-reactor systems to generate such material, advances in catalyst design and supporting technology have allowed for the development of single-reactor bimetallic catalyst systems capable of producing bimodal high density polyethylene (HDPE). These systems are attractive both from a cost perspective and ease of use.

Control of these properties is obtained for the most part by the choice of the catalyst system. Thus, the catalyst design is important for producing polymers that are attractive from a commercial standpoint. Because of the improved physical properties of polymers with the broad molecular distributions needed for commercially desirable products, there exists a need for controlled techniques for forming polyethylene copolymers having a broad molecular weight distribution.

SUMMARY

An embodiment described herein provides a polymerization catalyst system, including at least three catalysts. The three catalysts include a metallocene catalyst, a first non-metallocene including a ligand complexed to a metal through two or more nitrogen atoms, and a second non-metallocene including a ligand complexed to a metal through one or more nitrogen atoms and an oxygen atom.

Another embodiment provides a polymer including ethylene, wherein the polymer comprises chains formed by at least three catalysts. The three catalysts include a metallocene catalyst, a first non-metallocene including a ligand complexed to a metal through two or more nitrogen atoms, and a second non-metallocene including a ligand complexed to a metal through one or more nitrogen atoms and an oxygen atom.

Another embodiment provides a method for generating a polyethylene polymer, including reacting at least ethylene with a catalyst system comprising at least three commonly supported catalysts. The three catalysts include a metallocene catalyst, a first non-metallocene including a ligand complexed to a metal through two or more nitrogen atoms, and a second non-metallocene including a ligand complexed to a metal through one or more nitrogen atoms and an oxygen atom.

DETAILED DESCRIPTION

It has been discovered that when a catalyst support is impregnated with multiple catalysts, new polymeric materials with improved balance of properties, such as stiffness, toughness, processibility, and environmental stress crack resistance, can be achieved, for example, by controlling the amounts and types of catalysts present on the support. As described in embodiments herein, appropriate selection of the catalysts and ratios may be used to adjust the combined molecular weight distribution (MWD) of the polymer produced. The MWD can be controlled by combining catalysts with the appropriate weight average molecular weight (Mw) and individual molecular weight distributions. For example, the typical MWD for linear metallocene polymers is 2.5-3.5. Blend studies indicate it would be desirable to broaden this distribution by employing mixtures of catalysts that each provides different average molecular weights. The ratio of the Mw for a low molecular weight component and a high molecular weight component would be between 1:1 and 1:10, or about 1:2 and 1:5.

Figure 1:
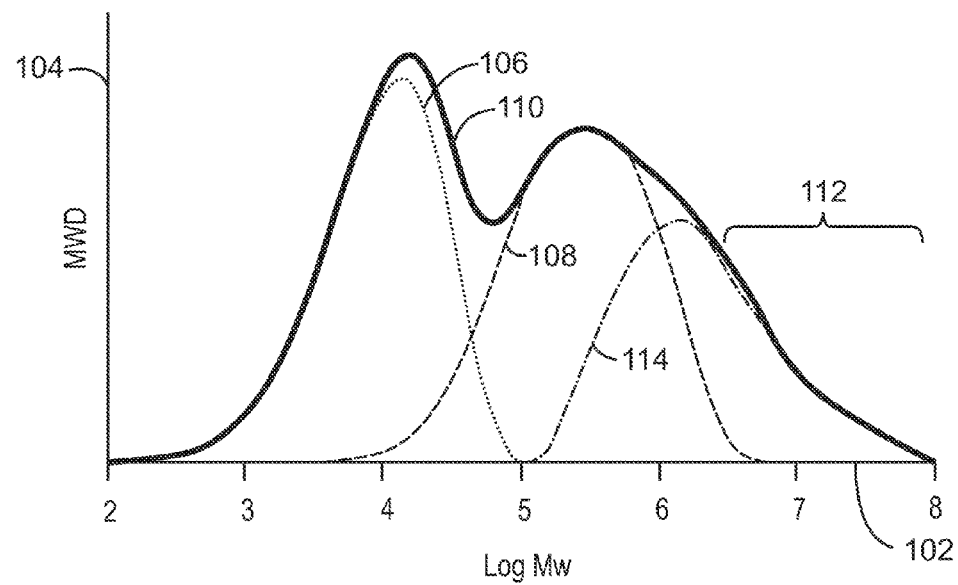
FIG. 1 is a plot of molecular weight distributions for a three catalyst system that includes a metallocene and two non-metallocene catalysts, in accordance with embodiments described herein.
Figure 3:
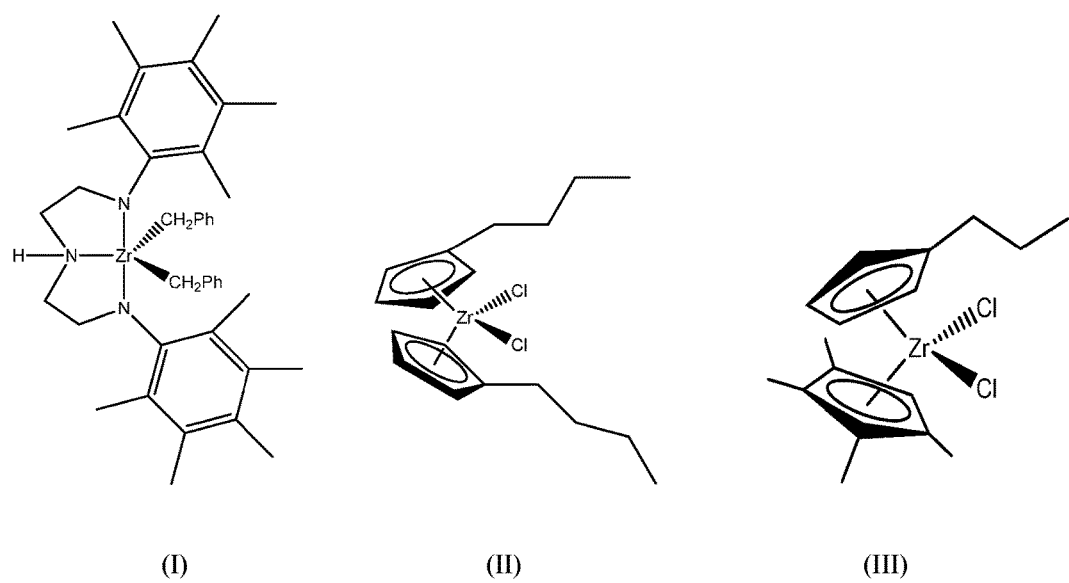
FIG. 3 provides structures of three catalysts according to embodiments of the present disclosure.

FIG. 1 is a plot 100 of molecular weight distributions for a three catalyst system that includes a metallocene and two non-metallocene catalysts, in accordance with embodiments described herein. In the plot 100, the x-axis 102 represents the log of the molecular weight, and the y-axis 104 represents the molecular weight distribution, i.e., the amount of each molecular weight that is present. Each of the catalysts can be selected to contribute a certain molecular weight component. For example, a metallocene may then be selected to produce a low molecular weight component 106, wherein, for example, a first metallocene catalyst, shown in structure (II) seen in FIG. 3, may be selected for resins to be used for film and blow-molding applications, while another metallocene catalyst, shown in structure (III) seen in FIG. 3, for pipe applications. Other metallocenes, as described herein, may be selected for other types of applications. A non-metallocene, such as the catalyst shown in structure (I), seen in FIG. 3, may be selected to produce a higher molecular weight component 108. The individual molecular weight components form a single molecular weight distribution (MWD) 110 for the polymer. The non-metallocene (I) and metallocenes (II and III) are not limited to the formulas shown, but may include any number of other catalyst systems.

Although two catalyst combinations, such as (I) and (II) (HN5/B), or (I) and (III), provide attractive properties, some problematic issues still remain. For example, while a high molecular weight portion or tail 112 in the MWD 110, for example, having polymer chains with log molecular weights higher than about 6.5, is thought to impart strength that is important in products such as extruded pipe and blown film, a substantial difference in molecular weight of the two fractions may cause them to phase separate, leading to problems such as melt fracture and bubble instability. Further, the polymers made from two catalyst blends may be deficient with regards to measures of parison stability. For example, the extruded plastic, or parison, may extends too far out of the die and not contract enough after extrusion. In other situations, the parison may not flow far enough and contracts too much after extrusion. Resins made using the three catalyst blends described herein do not have that problem.

Thus, it is desirable to maintain the molecular weight separation of higher molecular weight components 108 and low molecular weight components 106 while introducing an intermediate molecular weight to fill the gap between the high and low molecular weights. In an embodiment an additional catalyst is added to increase the molecular weight distribution of the higher molecular weight component 108 by adding a still higher molecular weight component with molecular weight distribution 114. This will maintain the polymer strength associated with the high molecular weight distribution. Thus, a replacement catalyst system that includes three catalysts is described in embodiments herein. The additional non-metallocene catalyst may have a productivity equal to or greater than previously tested non-metallocene catalysts, a molecular weight distribution that is greater than previously tested non-metallocene catalysts, and a high molecular weight tail 112.

These embodiments use non-metallocene catalysts that have bi- or tridentate ligands that use both an oxygen atom and a nitrogen atom to complex a central metal. For example, structure (IV) shown below. It can be noted that embodiments are not limited to structure (IV), as any number of similar catalysts may be used. For example, as discussed herein, other substituents may be used in place of the aryl rings pendant from the nitrogen groups, any other number of other substitution patterns may be used on the aryl groups, such as shown for structure (V), below. As used herein, structure (I) is also known as HN5, structure (II) is also known as B, and structure (IV) is also known as NON5. Thus, a two component blend used in the examples may be termed HN5/B, while a three component blend may be termed HN5/B/NON5.

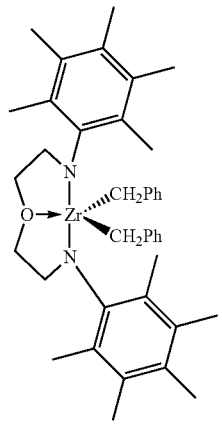

(IV)

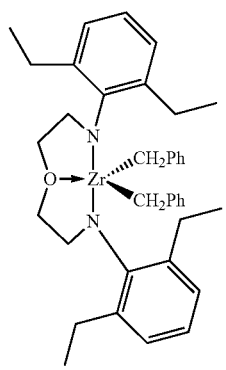

(V)

Generally, the mixed catalyst system provides a polymer with a mix of beneficial properties as a result of the broad molecular weight distribution and the density of each of the low and high molecular weight components. The ability to control the molecular weight distribution and the short-chain branching of each component of the system is vital in determining the processibility and strength of the resultant polymer.

Employing multiple pre-catalysts that are co-supported on a single support mixed with an activator, such as a silica methylaluminoxane (SMAO), can provide a cost advantage by making the product in one reactor instead of multiple reactors. Further, using a single support also ensures intimate mixing of the polymers and offers improved operability relative to preparing a mixture of polymers of different Mw and density independently from multiple catalysts in a single reactor. As used herein, a pre-catalyst is a catalyst compound prior to exposure to monomer and the initiation of the catalyst reaction. The catalysts can be co-supported during a single operation, or may be used in a trim operation, in which additional catalysts are added to catalysts that are supported.

These factors can be adjusted by controlling the MWD, which, in turn, can be adjusted by changing the relative amount of the combination of pre-catalysts on the support. This may be adjusted during the formation of the pre-catalysts, for example, by supporting the three, or more, catalysts on a single support. In some embodiments, the relative amounts of the pre-catalysts can be adjusted by adding one of the components to a catalyst mixture en-route to the reactor in a process termed "trim". Trim is discussed in U.S. Pat. Nos. 6,605,675; 6,608,149; 6,689,847; and 6,825,287, herein included by reference. Feedback of polymer property data can be used to control the amount of catalyst addition. Metallocenes (MCNs) are known to trim well with other catalysts.

Various catalyst systems and components may be used to generate the polymers and molecular weight compositions disclosed. These are discussed in the sections to follow. The first section discusses catalyst compounds that can be used in embodiments, including metallocene and non-metallocene catalysts, among others. The second section discusses generating catalyst slurries that may be used for implementing the techniques described. The third section discusses supports that may be used. The fourth section discusses catalyst activators that may be used. The fifth section discusses the catalyst component solutions that may be used to add additional catalysts in trim systems. Gas phase polymerizations may use static control or continuity agents, which are discussed in the fifth section. A gas-phase polymerization reactor with a trim feed system is discussed in the sixth section. The use of the catalyst composition to control product properties is discussed in a sixth section and an exemplary polymerization process is discussed in the seventh section. Examples of the implementation of the procedures discussed in incorporated into an eighth section.

Catalyst Compounds
Metallocene Catalyst Compounds

Metallocene catalyst compounds are generally described 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243-296 (1999); and, in particular, for use in the synthesis of polyethylene in 1 METALLOCENE-BASED POLYOLEFINS 261-377 (2000). The metallocene catalyst compounds can include "half sandwich" and/or "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

The Cp ligands are one or more rings or ring system(s), at least a portion of which includes π-bonded systems, such as cycloalkadienyl ligands and heterocyclic analogues. The ring(s) or ring system(s) typically include atoms selected from the group consisting of Groups 13 to 16 atoms, and, in a particular exemplary embodiment, the atoms that make up the Cp ligands are selected from the group consisting of carbon, nitrogen, oxygen, silicon, sulfur, phosphorous, germanium, boron, aluminum, and combinations thereof, where carbon makes up at least 50% of the ring members. In a more particular exemplary embodiment, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "H₄ Ind"), substituted versions thereof (as discussed and described in more detail below), and heterocyclic versions thereof.

The metal atom "M" of the metallocene catalyst compound can be selected from the group consisting of Groups 3 through 12 atoms and lanthanide Group atoms in one exemplary embodiment; and selected from the group consisting of Groups 3 through 10 atoms in a more particular exemplary embodiment; and selected from the group consisting of Sc, Ti, Zr, Hf, V, Nb, Ta, Mn, Re, Fe, Ru, Os, Co, Rh, Ir, and Ni in yet a more particular exemplary embodiment; and selected from the group consisting of Groups 4, 5, and 6 atoms in yet a more particular exemplary embodiment; and Ti, Zr, Hf atoms in yet a more particular exemplary embodiment; and Zr in yet a more particular exemplary embodiment. The oxidation state of the metal atom "M" can range from 0 to +7 in one exemplary embodiment; and in a more particular exemplary embodiment, can be +1, +2, +3, +4, or +5; and in yet a more particular exemplary embodiment can be +2, +3 or +4. The groups bound to the metal atom "M" are such that the compounds described below in the formulas and structures are electrically neutral, unless otherwise indicated. The Cp ligand forms at least one chemical bond with the metal atom M to form the "metallocene catalyst compound." The Cp ligands are distinct from the leaving groups bound to the catalyst compound in that they are not highly susceptible to substitution/abstraction reactions.

The one or more metallocene catalyst compounds can be represented by the structure (VI):

$$Cp^A Cp^B MX_n \qquad (VI)$$

in which M is as described above; each X is chemically bonded to M; each Cp group is chemically bonded to M; and n is 0 or an integer from 1 to 4, and either 1 or 2 in a particular exemplary embodiment.

The ligands represented by $Cp^A$ and $Cp^B$ in structure (VI) can be the same or different cyclopentadienyl ligands or ligands isolobal to cyclopentadienyl, either or both of which can contain heteroatoms and either or both of which can be substituted by a group R. In at least one specific embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of structure (VI) can be unsubstituted or substituted with any one or combination of substituent groups R. Non-limiting examples of substituent groups R as used in structure (VI) as well as ring substituents in structures discussed and described below, include groups selected from the group consisting of hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituents R associated with structures (VI) through (XI) include methyl, ethyl, propyl, butyl, pentyl, hexyl, cyclopentyl, cyclohexyl, benzyl, phenyl, methylphenyl, and tert-butylphenyl groups and the like, including all their isomers, for example, tertiary-butyl, isopropyl, and the like. Other possible radicals include substituted alkyls and aryls such as, for example, fluoromethyl, fluroethyl, difluroethyl, iodopropyl, bromohexyl, chlorobenzyl, hydrocarbyl substituted organometalloid radicals including trimethylsilyl, trimethylgermyl, methyldiethylsilyl, and the like, and halocarbyl-substituted organometalloid radicals, including tris(trifluoromethyl)silyl, methylbis(difluoromethyl)silyl, bromomethyldimethylgermyl and the like; and disubstituted boron radicals including dimethylboron, for example; and disubstituted Group 15 radicals including dimethylamine, dimethylphosphine, diphenylamine, methylphenylphosphine, as well as Group 16 radicals including methoxy, ethoxy, propoxy, phenoxy, methylsulfide and ethylsulfide. Other substituent groups R include, but are not limited to, olefins such as olefinically unsaturated substituents including vinyl-terminated ligands such as, for example, 3-butenyl, 2-propenyl, 5-hexenyl, and the like. In one exemplary embodiment, at least two R groups (two adjacent R groups in a particular exemplary embodiment) are joined to form a ring structure having from 3 to 30 atoms selected from the group consisting of carbon, nitrogen, oxygen, phosphorous, silicon, germanium, aluminum, boron, and combinations thereof. Also, a substituent group R such as 1-butanyl can form a bonding association to the element M.

Each leaving group, or X, in the structure (VI) above and for the structures in (VII) through (IX) below is independently selected from the group consisting of: halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof, in a more particular exemplary embodiment; hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular exemplary embodiment; hydride, chloride, fluoride, methyl, phenyl, phenoxy, benzoxy, tosyl, fluoromethyls and fluorophenyls, in yet a more particular exemplary embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls, and $C_1$ to $C_{12}$ heteroatom-containing alkylaryls, in yet a more particular exemplary embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls, in yet a more particular exemplary embodiment; chloride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls), in yet a more particular exemplary embodiment.

Other non-limiting examples of X groups include amides, amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides, halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one exemplary embodiment, two or more X's form a part of a fused ring or ring system. In at least one specific embodiment, X can be a leaving group selected from the group consisting of chloride ions, bromide ions, $C_1$ to $C_{10}$ alkyls, and $C_2$ to $C_{12}$ alkenyls, carboxylates, acetylacetonates, and alkoxides.

The metallocene catalyst compound includes those of structure (VI) where $Cp^A$ and $Cp^B$ are bridged to each other by at least one bridging group, (A), such that the structure is represented by structure (VII):

$$Cp^A(A)Cp^BMX_n \quad (VII)$$

These bridged compounds represented by structure (VII) are known as "bridged metallocenes." The elements $Cp^A$, $Cp^B$, M, X and n in structure (VII) are as defined above for structure (VI); where each Cp ligand is chemically bonded to M, and (A) is chemically bonded to each Cp. The bridging group (A) can include divalent hydrocarbon groups containing at least one Group 13 to 16 atom, such as, but not limited to, at least one of a carbon, oxygen, nitrogen, silicon, aluminum, boron, germanium, tin atom, and combinations thereof; where the heteroatom can also be $C_1$ to $C_{12}$ alkyl or aryl substituted to satisfy neutral valency. In at least one specific embodiment, the bridging group (A) can also include substituent groups R as defined above (for structure (VI)) including halogen radicals and iron. In at least one specific embodiment, the bridging group (A) can be represented by $C_1$ to $C_6$ alkylenes, substituted $C_1$ to $C_6$ alkylenes, oxygen, sulfur, $R'_2C=$, $R'_2Si=$, $=Si(R')_2Si(R'_2)=$, $R'_2Ge=$, and $R'P=$, where "=" represents two chemical bonds, R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and where two or more R' can be joined to form a ring or ring system. In at least one specific embodiment, the bridged metallocene catalyst compound of structure (VII) includes two or more bridging groups (A). In one or more embodiments, (A) can be a divalent bridging group bound to both $Cp^A$ and $Cp^B$ selected from the group consisting of divalent $C_1$ to $C_{20}$ hydrocarbyls and $C_1$ to $C_{20}$ heteroatom containing hydrocarbonyls, where the heteroatom containing hydrocarbonyls include from one to three heteroatoms.

The bridging group (A) can include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties where the Si atom is replaced by a Ge or a C atom; as well as dimethylsilyl, diethylsilyl, dimethylgermyl and diethylgermyl.

The bridging group (A) can also be cyclic, having, for example, 4 to 10 ring members; in a more particular exemplary embodiment, bridging group (A) can have 5 to 7 ring members. The ring members can be selected from the elements mentioned above, and, in a particular embodiment, can be selected from one or more of B, C, Si, Ge, N, and O. Non-limiting examples of ring structures which can be present as, or as part of, the bridging moiety are cyclobutylidene, cyclopentylidene, cyclohexylidene, cycloheptylidene, cyclooctylidene and the corresponding rings where one or two carbon atoms are replaced by at least one of Si, Ge, N and O. In one or more embodiments, one or two carbon atoms can be replaced by at least one of Si and Ge. The bonding arrangement between the ring and the Cp groups can be cis-, trans-, or a combination thereof.

The cyclic bridging groups (A) can be saturated or unsaturated and/or can carry one or more substituents and/or can be fused to one or more other ring structures. If present, the one or more substituents can be, in at least one specific embodiment, selected from the group consisting of hydrocarbyl (e.g., alkyl, such as methyl) and halogen (e.g., F, Cl). The one or more Cp groups to which the above cyclic bridging moieties can optionally be fused can be saturated or unsaturated, and are selected from the group consisting of those having 4 to 10, more particularly 5, 6, or 7 ring members (selected from the group consisting of C, N, O, and S in a particular exemplary embodiment) such as, for example, cyclopentyl, cyclohexyl and phenyl. Moreover, these ring structures can themselves be fused such as, for example, in the case of a naphthyl group. Moreover, these (optionally fused) ring structures can carry one or more substituents. Illustrative, non-limiting examples of these substituents are hydrocarbyl (particularly alkyl) groups and halogen atoms. The ligands $Cp^A$ and $Cp^B$ of structure (VI) and (VII) can be different from each other. The ligands $Cp^A$ and $Cp^B$ of structure (VI) and (VII) can be the same.

The metallocene catalyst compound can include bridged mono-ligand metallocene compounds (e.g., mono cyclopentadienyl catalyst components). Exemplary metallocene catalyst compounds are further described in U.S. Pat. No. 6,943,134.

It is contemplated that the metallocene catalyst components discussed and described above include their structural or optical or enantiomeric isomers (racemic mixture), and, in one exemplary embodiment, can be a pure enantiomer. As used herein, a single, bridged, asymmetrically substituted metallocene catalyst compound having a racemic and/or meso isomer does not, itself, constitute at least two different bridged, metallocene catalyst components.

The amount of the transition metal component of the one or more metallocene catalyst compounds in the catalyst system can range from a low of about 0.2 wt. %, about 3 wt. %, about 0.5 wt. %, or about 0.7 wt. % to a high of about 1 wt. %, about 2 wt. %, about 2.5 wt. %, about 3 wt. %, about 3.5 wt. %, or about 4 wt. %, based on the total weight of the catalyst system.

The metallocene catalyst compounds can include any combination of any embodiment discussed and described herein. For example, the metallocene catalyst compound can include, but is not limited to, bis(n-butylcyclopentadienyl) zirconium $(CH_3)_2$, bis(n-butylcyclopentadienyl) zirconium $Cl_2$, bis(n-butylcyclopentadienyl) zirconium $Cl_2$, (n-propylcyclopentadienyl, tetramethylcyclopentadienyl) zirconium $Cl_2$, [(pentamethyphenylNCH$_2$CH$_2$)$_2$NH]ZrBn$_2$, [(pentamethylphenylNCH$_2$CH$_2$)$_2$O]ZrBn$_2$, or any combinations thereof.

In addition to the metallocene catalyst compounds discussed and described above, other suitable metallocene catalyst compounds can include, but are not limited to, metallocenes discussed and described in U.S. Pat. Nos. 7,741,417; 7,179,876; 7,169,864; 7,157,531; 7,129,302; 6,995,109; 6,958,306; 6,884,748; 6,689,847; and WO Publications: WO 1997/022635; WO 1998/046651; WO 2000/069922; WO 2001/030860; WO 2001/030861; WO 2002/046246; WO 2002/050088; WO 2004/026921; and WO 06/019494.

Although the catalyst compounds may be written or shown with methyl-, chloro-, or phenyl-leaving groups attached to the central metal, it can be understood that these groups may be different without changing the catalyst involved. For example, each of these ligands may independently be a benzyl group (Bn), a methyl group (Me), a chloro group (CO, a fluoro group (F), or any number of other groups, including organic groups, or heteroatom groups.

Further, these ligands will change during the reaction, as a pre-catalyst is converted to the active catalyst for the reaction.

Group 15 Atom and Non-Metallocene Catalyst Compounds

The catalyst system can include one or more Group 15 metal-containing catalyst compounds. As used herein, these are termed non-metallocene catalyst compounds. The Group metal-containing compound generally includes a Group 3 to 14 metal atom, a Group 3 to 7, or a Group 4 to 6 metal atom. In many embodiments, the Group 15 metal-containing compound includes a Group 4 metal atom bound to at least one leaving group and also bound to at least two Group 15 atoms, at least one of which is also bound to a Group 15 or 16 atom through another group.

In one or more embodiments, at least one of the Group 15 atoms is also bound to a Group 15 or 16 atom through another group which may be a $C_1$ to $C_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and can optionally be bound to hydrogen, a halogen, a heteroatom or a hydrocarbyl group, or a heteroatom containing group.

The Group 15-containing metal compounds can be described more particularly with structures (VIII) or (IX):

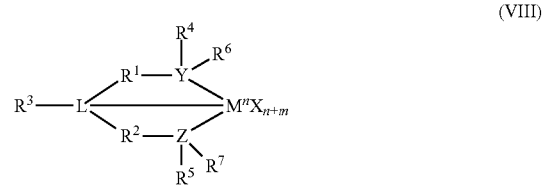

(VIII)

(IX)

where M is a Group 3 to 12 transition metal or a Group 13 or 14 main group metal, a Group 4, 5, or 6 metal. In many embodiments, M is a Group 4 metal, such as zirconium, titanium, or hafnium. Each X is independently a leaving group, such as an anionic leaving group. The leaving group may include a hydrogen, a hydrocarbyl group, a heteroatom, a halogen, or an alkyl; y is 0 or 1 (when y is 0 group L' is absent). The term 'n' is the oxidation state of M. In various embodiments, n is +3, +4, or +5. In many embodiments, n is +4. The term 'm' represents the formal charge of the YZL or the YZL' ligand, and is 0, −1, −2 or −3 in various embodiments. In many embodiments, m is −2. L is a Group 15 or 16 element, such as nitrogen or oxygen; L' is a Group 15 or 16 element or Group 14 containing group, such as carbon, silicon or germanium. Y is a Group 15 element, such as nitrogen or phosphorus. In many embodiments, Y is nitrogen. Z is a Group 15 element, such as nitrogen or phosphorus. In many embodiments, Z is nitrogen. $R^1$ and $R^2$ are, independently, a $C_1$ to $C_{20}$ hydrocarbon group, a heteroatom containing group having up to twenty carbon atoms, silicon, germanium, tin, lead, or phosphorus. In many embodiments, $R^1$ and $R^2$ are a $C_2$ to $C_{20}$ alkyl, aryl or aralkyl group, such as a linear, branched or cyclic $C_2$ to $C_{20}$ alkyl group, or a $C_2$ to $C_6$ hydrocarbon group, such as the X described with respect to structures (VI) and (VII) above. $R^1$ and $R^2$ may also be interconnected to each other. $R^3$ may be absent or may be a hydrocarbon group, a hydrogen, a halogen, a heteroatom containing group. In many embodiments, $R^3$ is absent, for example, if L is an oxygen, or a hydrogen, or a linear, cyclic, or branched alkyl group having 1 to 20 carbon atoms. $R^4$ and $R^5$ are independently an alkyl group, an aryl group, substituted aryl group, a cyclic alkyl group, a substituted cyclic alkyl group, a cyclic aralkyl group, a substituted cyclic aralkyl group, or multiple ring system, often having up to 20 carbon atoms. In many embodiments, $R^4$ and $R^5$ have between 3 and 10 carbon atoms, or are a $C_1$ to $C_{20}$ hydrocarbon group, a $C_1$ to $C_{20}$ aryl group or a $C_1$ to $C_{20}$ aralkyl group, or a heteroatom containing group. $R^4$ and $R^5$ may be interconnected to each other. $R^6$ and $R^7$ are independently absent, hydrogen, an alkyl group, halogen, heteroatom, or a hydrocarbyl group, such as a linear, cyclic or branched alkyl group having 1 to 20 carbon atoms. In many embodiments, $R^6$ and $R^7$ are absent. R* may be absent, or may be a hydrogen, a Group 14 atom containing group, a halogen, or a heteroatom containing group.

By "formal charge of the YZL or YZL' ligand," it is meant the charge of the entire ligand absent the metal and the leaving groups X. By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups. An alkyl group may be linear, branched alkyl radicals, alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

In one or more embodiments, $R^4$ and $R^5$ are independently a group represented by the following structure (X).

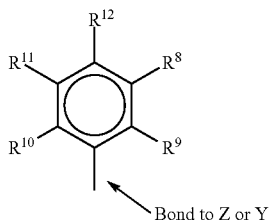

(X)

When $R^4$ and $R^5$ are as formula VII, $R^8$ to $R^{12}$ are each independently hydrogen, a $C_1$ to $C_{40}$ alkyl group, a halide, a heteroatom, a heteroatom containing group containing up to 40 carbon atoms. In many embodiments, $R^8$ to $R^{12}$ are a $C_1$ to $C_{20}$ linear or branched alkyl group, such as a methyl, ethyl, propyl, or butyl group. Any two of the R groups may form a cyclic group and/or a heterocyclic group. The cyclic groups may be aromatic. In one embodiment $R^9$, $R^{10}$ and $R^{12}$ are independently a methyl, ethyl, propyl, or butyl group (including all isomers). In another embodiment, $R^9$, $R^{10}$ and $R^{12}$ are methyl groups, and $R^8$ and $R^{11}$ are hydrogen.

In one or more embodiments, $R^4$ and $R^5$ are both a group represented by the following structure (XI).

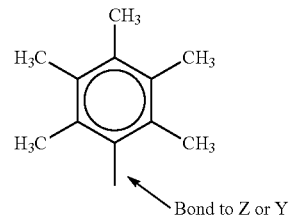

(XI)

When $R^4$ and $R^5$ follow structure (XI), M is a Group 4 metal, such as zirconium, titanium, or hafnium. In many embodiments, M is zirconium. Each of L, Y, and Z may be a nitrogen. Each of $R^1$ and $R^2$ may be —$CH_2$—$CH_2$—. $R^3$ may be hydrogen, and $R^6$ and $R^7$ may be absent.

The Group 15 metal-containing catalyst compound can be represented by structure (IV). In formula IV, Ph represents phenyl. Representative Group 15-containing metal compounds and preparation thereof can be as discussed and described in U.S. Pat. Nos. 5,318,935; 5,889,128; 6,333,389; 6,271,325; and 6,689,847; WO Publications WO 99/01460; WO 98/46651; WO 2009/064404; WO 2009/064452; and WO 2009/064482; and EP 0 893 454; and EP 0 894 005.

Catalyst Forms

The catalyst system may include a catalyst component in a slurry, which may have an initial catalyst compound, and an added solution catalyst component that is added to the slurry. Generally, a non-metallocene catalyst will be supported in the initial slurry, depending on solubility. However, in some embodiments, the initial catalyst component slurry may have no catalysts. In this case, two or more solution catalysts may be added to the slurry to cause each to be supported.

Any number of combinations of catalyst components may be used in embodiments. For example, the catalyst component slurry can include an activator and a support, or a supported activator. Further, the slurry can include a catalyst compound in addition to the activator and the support. As noted, the catalyst compound in the slurry may be supported.

The slurry may include one or more activators and supports, and one more catalyst compounds. For example, the slurry may include two or more activators (such as alumoxane and a modified alumoxane) and a catalyst compound, or the slurry may include a supported activator and more than one catalyst compounds. In one embodiment, the slurry includes a support, an activator, and two catalyst compounds. In another embodiment the slurry includes a support, an activator and two different catalyst compounds, which may be added to the slurry separately or in combination. The slurry, containing silica and alumoxane, may be contacted with a catalyst compound, allowed to react, and thereafter the slurry is contacted with another catalyst compound, for example, in a trim system.

The molar ratio of metal in the activator to metal in the catalyst compound in the slurry may be 1000:1 to 0.5:1, 300:1 to 1:1, or 150:1 to 1:1. The slurry can include a support material which may be any inert particulate carrier material known in the art, including, but not limited to, silica, fumed silica, alumina, clay, talc or other support materials such as disclosed above. In one embodiment, the slurry contains silica and an activator, such as methyl aluminoxane ("MAO"), modified methyl aluminoxane ("MMAO"), as discussed further below.

One or more diluents or carriers can be used to facilitate the combination of any two or more components of the catalyst system in the slurry or in the trim catalyst solution. For example, the single site catalyst compound and the activator can be combined together in the presence of toluene or another non-reactive hydrocarbon or hydrocarbon mixture to provide the catalyst mixture. In addition to toluene, other suitable diluents can include, but are not limited to, ethylbenzene, xylene, pentane, hexane, heptane, octane, other hydrocarbons, or any combination thereof. The support, either dry or mixed with toluene can then be added to the catalyst mixture or the catalyst/activator mixture can be added to the support.

The catalyst is not limited to a slurry arrangement, as a mixed catalyst system may be made on a support and dried. The dried catalyst system can then be fed to the reactor through a dry feed system.

Support

As used herein, the terms "support" and "carrier" are used interchangeably and refer to any support material, including a porous support material, such as talc, inorganic oxides, and inorganic chlorides. The one or more single site catalyst compounds of the slurry can be supported on the same or separate supports together with the activator, or the activator can be used in an unsupported form, or can be deposited on a support different from the single site catalyst compounds, or any combination thereof. This may be accomplished by any technique commonly used in the art. There are various other methods in the art for supporting a single site catalyst compound. For example, the single site catalyst compound can contain a polymer bound ligand as described in, for example, U.S. Pat. Nos. 5,473,202 and 5,770,755. The single site catalyst compounds of the slurry can be spray dried as described in, for example, U.S. Pat. No. 5,648,310. The support used with the single site catalyst compound can be functionalized, as described in EP 0 802 203, or at least one substituent or leaving group is selected as described in U.S. Pat. No. 5,688,880.

The support can be or include one or more inorganic oxides, for example, of Group 2, 3, 4, 5, 13, or 14 elements. The inorganic oxide can include, but is not limited to silica, alumina, titania, zirconia, boria, zinc oxide, magnesia, or any combination thereof. Illustrative combinations of inorganic oxides can include, but are not limited to, alumina-silica, silica-titania, alumina-silica-titania, alumina-zirconia, alumina-titania, and the like. The support can be or include silica, alumina, or a combination thereof. In one embodiment described herein, the support is silica.

Suitable commercially available silica supports can include, but are not limited to, ES757, ES70, and ES70W available from PQ Corporation. Suitable commercially available silica-alumina supports can include, but are not limited to, SIRAL® 1, SIRAL® 5, SIRAL® 10, SIRAL® 20, SIRAL® 28M, SIRAL® 30, and SIRAL® 40, available from SASOL®. Generally, catalysts supports comprising silica gels with activators, such as methylaluminoxanes (MAOs), are used in the trim systems described, since these supports may function better for cosupporting solution carried catalysts.

Suitable catalyst supports are discussed and described in Hlatky, Chem. Rev. (2000), 100, 1347 1376 and Fink et al., Chem. Rev. (2000), 100, 1377 1390, U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032 and 5,770,664, and WO 95/32995, WO 95/14044, WO 96/06187, and WO 97/02297.

Activator

As used herein, the term "activator" may refer to any compound or combination of compounds, supported, or unsupported, which can activate a single site catalyst compound or component, such as by creating a cationic species of the catalyst component. For example, this can include the abstraction of at least one leaving group (the "X" group in the single site catalyst compounds described herein) from the metal center of the single site catalyst compound/component. The activator may also be referred to as a "co-catalyst".

For example, the activator can include a Lewis acid or a non-coordinating ionic activator or ionizing activator, or any other compound including Lewis bases, aluminum alkyls, and/or conventional-type co-catalysts. In addition to methylaluminoxane ("MAO") and modified methylaluminoxane ("MMAO") mentioned above, illustrative activators can include, but are not limited to, aluminoxane or modified aluminoxane, and/or ionizing compounds, neutral or ionic, such as tri (n-butyl)ammonium tetrakis(pentafluorophenyl) boron, a trisperfluorophenyl boron metalloid precursor, a trisperfluoronaphthyl boron metalloid precursor, or any combinations thereof.

Aluminoxanes can be described as oligomeric aluminum compounds having —Al(R)—O— subunits, where R is an alkyl group. Examples of aluminoxanes include, but are not limited to, methylaluminoxane ("MAO"), modified methylaluminoxane ("MMAO"), ethylaluminoxane, isobutylaluminoxane, or a combination thereof. Aluminoxanes can be produced by the hydrolysis of the respective trialkylaluminum compound. MMAO can be produced by the hydrolysis of trimethylaluminum and a higher trialkylaluminum, such as triisobutylaluminum. MMAOs are generally more soluble in aliphatic solvents and more stable during storage. There are a variety of methods for preparing aluminoxane and modified aluminoxanes, non-limiting examples can be as discussed and described in U.S. Pat. Nos. 4,665,208; 4,952,540; 5,091,352; 5,206,199; 5,204,419; 4,874,734; 4,924,018; 4,908,463; 4,968,827; 5,308,815; 5,329,032; 5,248,801; 5,235,081; 5,157,137; 5,103,031; 5,391,793; 5,391,529; 5,693,838; 5,731,253; 5,731,451; 5,744,656; 5,847,177; 5,854,166; 5,856,256; and 5,939,346; and EP 0 561 476; EP 0 279 586; EP 0 594-218; and EP 0 586 665; and WO Publications WO 94/10180 and WO 99/15534.

As noted above, one or more organo-aluminum compounds such as one or more alkylaluminum compounds can be used in conjunction with the aluminoxanes. For example, alkylaluminum species that may be used are diethylaluminum ethoxide, diethylaluminum chloride, and/or diisobutylaluminum hydride. Examples of trialkylaluminum compounds include, but are not limited to, trimethylaluminum, triethylaluminum ("TEAL"), triisobutylaluminum ("TiBAl"), tri-n-hexylaluminum, tri-n-octylaluminum, tripropylaluminum, tributylaluminum, and the like.

Catalyst Component Solution

The catalyst component solution may include only a catalyst compound, such as a metallocene, or may include an activator in addition to the catalyst compound. The catalyst solution used in the trim process can be prepared by dissolving the catalyst compound and optional activators in a liquid solvent. The liquid solvent may be an alkane, such as a $C_5$ to $C_{30}$ alkane, or a $C_5$ to $C_{10}$ alkane. Cyclic alkanes such as cyclohexane and aromatic compounds such as toluene may also be used. In addition, mineral oil may be used as a solvent. The solution employed should be liquid under the conditions of polymerization and relatively inert. In one embodiment, the liquid utilized in the catalyst compound solution is different from the diluent used in the catalyst component slurry. In another embodiment, the liquid utilized in the catalyst compound solution is the same as the diluent used in the catalyst component solution.

If the catalyst solution includes both activator and catalyst compound, the ratio of metal in the activator to metal in the catalyst compound in the solution may be 1000:1 to 0.5:1, 300:1 to 1:1, or 150:1 to 1:1. In various embodiments, the activator and catalyst compound are present in the solution at up to about 90 wt. %, at up to about 50 wt. %, at up to about 20 wt. %, preferably at up to about 10 wt. %, at up to about 5 wt. %, at less than 1 wt. %, or between 100 ppm and 1 wt. %, based upon the weight of the solvent and the activator or catalyst compound.

The catalyst component solution can comprises any one of the soluble catalyst compounds described in the catalyst section herein. As the catalyst is dissolved in the solution, a higher solubility is desirable. Accordingly, the catalyst compound in the catalyst component solution may often include a metallocene, which may have higher solubility than other catalysts.

In the polymerization process, described below, any of the above described catalyst component containing solutions may be combined with any of the catalyst component containing slurry/slurries described above. In addition, more than one catalyst component solution may be utilized.

Continuity Additive/Static Control Agent

In gas-phase polyethylene production processes, it may be desirable to use one or more static control agents to aid in regulating static levels in the reactor. As used herein, a static control agent is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependent upon the polymer being produced and the single site catalyst compounds being used. For example, the use of static control agents is disclosed in European Patent No. 0229368 and U.S. Pat. Nos. 4,803,251; 4,555,370; and 5,283,278, and references cited therein.

Control agents such as aluminum stearate may be employed. The static control agent used may be selected for its ability to receive the static charge in the fluidized bed without adversely affecting productivity. Other suitable static control agents may also include aluminum distearate, ethoxlated amines, and anti-static compositions such as those provided by Innospec Inc. under the trade name OCTASTAT. For example, OCTASTAT 2000 is a mixture of a polysulfone copolymer, a polymeric polyamine, and oil-soluble sulfonic acid.

Any of the aforementioned control agents, as well as those described in, for example, WO 2001/044322, listed under the heading Carboxylate Metal Salt and including those chemicals and compositions listed as antistatic agents may be employed either alone or in combination as a control agent. For example, the carboxylate metal salt may be combined with an amine containing control agent (e.g., a carboxylate metal salt with any family member belonging to the KEMAMINE® (available from Crompton Corporation) or ATMER® (available from ICI Americas Inc.) family of products).

Other useful continuity additives include ethyleneimine additives useful in embodiments disclosed herein may include polyethyleneimines having the following general formula:

in which n may be from about 10 to about 10,000. The polyethyleneimines may be linear, branched, or hyper-branched (e.g., forming dendritic or arborescent polymer structures). They can be a homopolymer or copolymer of ethyleneimine or mixtures thereof (referred to as polyethyleneimine(s) hereafter). Although linear polymers represented by the chemical formula —[$CH_2$—$CH_2$—NH]— may be used as the polyethyleneimine, materials having primary, secondary, and tertiary branches can also be used. Commercial polyethyleneimine can be a compound having branches of the ethyleneimine polymer.

Suitable polyethyleneimines are commercially available from BASF Corporation under the trade name Lupasol. These compounds can be prepared as a wide range of molecular weights and product activities. Examples of commercial polyethyleneimines sold by BASF suitable for use in the present invention include, but are not limited to, Lupasol FG and Lupasol WF.

Another useful continuity additive can include a mixture of aluminum distearate and an ethoxylated amine-type compound, e.g., IRGASTAT AS-990, available from Huntsman (formerly Ciba Specialty Chemicals). The mixture of aluminum distearate and ethoxylated amine type compound can be slurried in mineral oil e.g., Hydrobrite 380. For example, the mixture of aluminum distearate and an ethoxylated amine type compound can be slurried in mineral oil to have total slurry concentration of ranging from about 5 wt. % to about 50 wt. % or about 10 wt. % to about 40 wt. %, or about 15 wt. % to about 30 wt. %. Other useful static control agents and additives are disclosed in U.S. Patent Application Publication No. 2008/0045663.

The continuity additive(s) or static control agent(s) may be added to the reactor in an amount ranging from 0.05 to 200 ppm, based on the weight of all feeds to the reactor, excluding recycle. In some embodiments, the continuity additive may be added in an amount ranging from 2 to 100 ppm, or in an amount ranging from 4 to 50 ppm.

Gas Phase Polymerization Reactor

Figure 2:
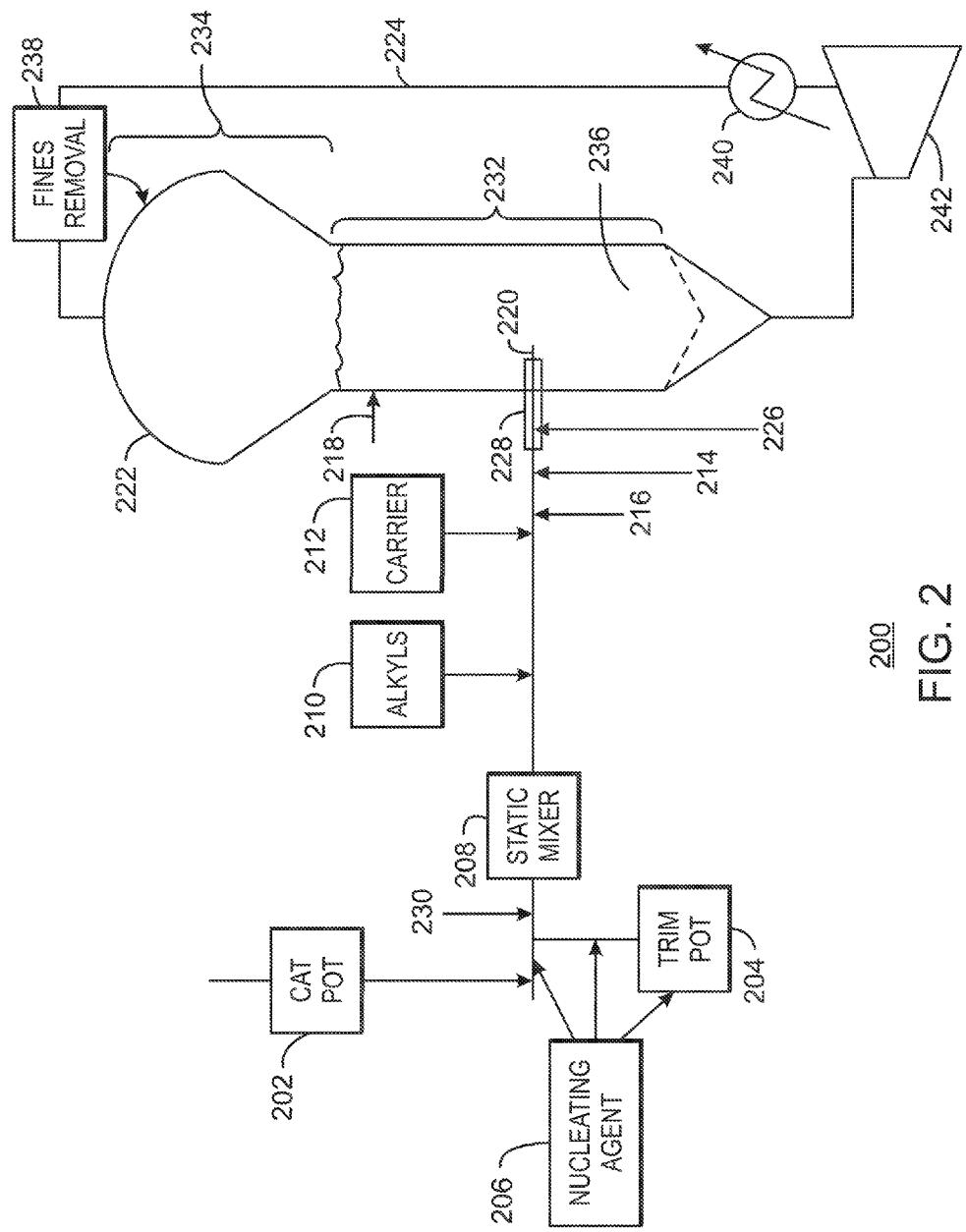
FIG. 2 is a schematic of a gas-phase reactor system, showing the addition of at least two catalysts, at least one of which is added as a trim catalyst.

FIG. 2 is a schematic of a gas-phase reactor system 200, showing the addition of at least two catalysts, at least one of which is added as a trim catalyst. The catalyst component slurry, preferably a mineral oil slurry including at least one support and at least one activator, at least one supported activator, and optional catalyst compounds may be placed in a vessel or catalyst pot (cat pot) 202. In one embodiment, the cat pot 202 is an agitated holding tank designed to keep the solids concentration homogenous. A catalyst component solution, prepared by mixing a solvent and at least one catalyst compound and/or activator, is placed in another vessel, which can be termed a trim pot 204. The catalyst component slurry can then be combined in-line with the catalyst component solution to form a final catalyst composition. A nucleating agent 206, such as silica, alumina, fumed silica or any other particulate matter may be added to the slurry and/or the solution in-line or in the vessels 202 or 204. Similarly, additional activators or catalyst compounds may be added in-line. For example, a second catalyst slurry that includes a different catalyst may be introduced from a second cat pot. The two catalyst slurries may be used as the catalyst system with or without the addition of a solution catalyst from the trim pot.

The catalyst component slurry and solution can be mixed in-line. For example, the solution and slurry may be mixed by utilizing a static mixer 208 or an agitating vessel (not shown). The mixing of the catalyst component slurry and the catalyst component solution should be long enough to allow the catalyst compound in the catalyst component solution to disperse in the catalyst component slurry such that the catalyst component, originally in the solution, migrates to the supported activator originally present in the slurry. The combination forms a uniform dispersion of catalyst compounds on the supported activator forming the catalyst composition. The length of time that the slurry and the solution are contacted is typically up to about 220 minutes, such as about 1 to about 60 minutes, about 5 to about 40 minutes, or about 10 to about 30 minutes.

When combining the catalysts, the activator and the optional support or additional co-catalysts, in the hydrocarbon solvents immediately prior to a polymerization reactor it is desirable that the combination yield a new polymerization catalyst in less than 1 h, less than 30 min, or less than 15 min. Shorter times are more effective, as the new catalyst is ready before being introduces into the reactor, providing the potential for faster flow rates.

In another embodiment, an aluminum alkyl, an ethoxylated aluminum alkyl, an aluminoxane, an anti-static agent or a borate activator, such as a $C_1$ to $C_{15}$ alkyl aluminum (for example tri-isobutyl aluminum, trimethyl aluminum or the like), a $C_1$ to $C_{15}$ ethoxylated alkyl aluminum or methyl aluminoxane, ethyl aluminoxane, isobutylaluminoxane, modified aluminoxane or the like are added to the mixture of the slurry and the solution in line. The alkyls, antistatic agents, borate activators and/or aluminoxanes may be added from an alkyl vessel 210 directly to the combination of the solution and the slurry, or may be added via an additional alkane (such as isopentane, hexane, heptane, and or octane) carrier stream, for example, from a hydrocarbon vessel 212. The additional alkyls, antistatic agents, borate activators and/or aluminoxanes may be present at up to about 500 ppm, at about 1 to about 300 ppm, at 10 to about 300 ppm, or at about 10 to about 100 ppm. Carrier streams that may be used include isopentane and or hexane, among others. The carrier may be added to the mixture of the slurry and the solution, typically at a rate of about 0.5 to about 60 lbs/hr (27 kg/hr). Likewise a carrier gas 214, such as nitrogen, argon, ethane, propane, and the like, may be added in-line to the mixture of the slurry and the solution. Typically the carrier gas may be added at the rate of about 1 to about 100 lb/hr (0.4 to 45 kg/hr), or about 1 to about 50 lb/hr (5 to 23 kg/hr), or about 1 to about 25 lb/hr (0.4 to 11 kg/hr).

In another embodiment, a liquid carrier stream is introduced into the combination of the solution and slurry that is moving in a downward direction. The mixture of the solution, the slurry and the liquid carrier stream may pass through a mixer or length of tube for mixing before being contacted with a gaseous carrier stream.

Similarly, a comonomer 216, such as hexene, another alpha-olefin, or diolefin, may be added in-line to the mixture of the slurry and the solution. The slurry/solution mixture is then passed through an injection tube 220 to a reactor 222. In some embodiments, the injection tube may aerosolize the slurry/solution mixture. Any number of suitable tubing sizes and configurations may be used to aerosolize and/or inject the slurry/solution mixture.

In one embodiment, a gas stream 226, such as cycle gas, or re-cycle gas, monomer, nitrogen, or other materials is introduced into a support tube 228 that surrounds the injection tube 220. To assist in proper formation of particles in the reactor 222, a nucleating agent 218, such as fumed silica, can be added directly into the reactor 222.

When a metallocene catalyst or other similar catalyst is used in the gas phase reactor, oxygen or fluorobenzene can be added to the reactor 222 directly or to the gas stream 226 to control the polymerization rate. Thus, when a metallocene catalyst (which is sensitive to oxygen or fluorobenzene) is used in combination with another catalyst (that is not sensitive to oxygen) in a gas phase reactor, oxygen can be used to modify the metallocene polymerization rate relative to the polymerization rate of the other catalyst. An example of such a catalyst combination is bis(n-propyl cyclopentadienyl)zirconium dichloride and $[(2,4,6-Me_3C_6H_2)NCH_2CH_2]_2NHZrBn_2$, where Me is methyl or bis(indenyl) zirconium dichloride and $[(2,4,6-Me_3C_6H_2)NCH_2CH_2]_2NHHfBn_2$, where Me is methyl. For example, if the oxygen concentration in the nitrogen feed is altered from 0.1 ppm to 0.5 ppm, significantly less polymer from the bisindenyl $ZrCl_2$ will be produced and the relative amount of polymer produced from the $[(2,4,6-Me_3C_6H_2)NCH_2CH_2]_2NHHfBn_2$ is increased. WO 1996/009328 discloses the addition of water or carbon dioxide to gas phase polymerization reactors, for example, for similar purposes. In one embodiment, the contact temperature of the slurry and the solution is in the range of from 0° C. to about 80° C., from about 0° C. to about 60° C., from about 10° C., to about 50° C., and from about 20° C. to about 40° C.

The example above is not limiting, as additional solutions and slurries may be included. For example, a slurry can be combined with two or more solutions having the same or different catalyst compounds and or activators. Likewise, the solution may be combined with two or more slurries each having the same or different supports, and the same or different catalyst compounds and or activators. Similarly, two or more slurries combined with two or more solutions, preferably in-line, where the slurries each comprise the same or different supports and may comprise the same or different catalyst compounds and or activators and the solutions comprise the same or different catalyst compounds and or activators. For example, the slurry may contain a supported activator and two different catalyst compounds, and two solutions, each containing one of the catalysts in the slurry, are each independently combined, in-line, with the slurry.

Use of Catalyst Composition to Control Product Properties

The properties of the product polymer may be controlled by adjusting the timing, temperature, concentrations, and sequence of the mixing of the solution, the slurry and any optional added materials (nucleating agents, catalyst compounds, activators, etc) described above. The MWD, melt index, relative amount of polymer produced by each catalyst, and other properties of the polymer produced may also be changed by manipulating process parameters. Any number of process parameters may be adjusted, including manipulating hydrogen concentration in the polymerization system, changing the amount of the first catalyst in the polymerization system, changing the amount of the second catalyst in the polymerization system. Other process parameters that can be adjusted include changing the relative ratio of the catalyst in the polymerization process (and optionally adjusting their individual feed rates to maintain a steady or constant polymer production rate). The concentrations of reactants in the reactor 222 can be adjusted by changing the amount of liquid or gas that is withdrawn or purged from the process, changing the amount and/or composition of a recovered liquid and/or recovered gas returned to the polymerization process, wherein the recovered liquid or recovered gas can be recovered from polymer discharged from the polymerization process. Further concentration parameters that can be adjusted include changing the polymerization temperature, changing the ethylene partial pressure in the polymerization process, changing the ethylene to comonomer ratio in the polymerization process, changing the activator to transition metal ratio in the activation sequence. Time dependent parameters may be adjusted, such as changing the relative feed rates of the slurry or solution, changing the mixing time, the temperature and or degree of mixing of the slurry and the solution in-line, adding different types of activator compounds to the polymerization process, and adding oxygen or fluorobenzene or other catalyst poison to the polymerization process. Any combinations of these adjustments may be used to control the properties of the final polymer product.

In one embodiment, the MWD of the polymer product is measured at regular intervals and one of the above process parameters, such as temperature, catalyst compound feed rate, the ratios of the two or more catalysts to each other, the ratio of comonomer to monomer, the monomer partial pressure, and or hydrogen concentration, is altered to bring the composition to the desired level, if necessary. The MWD may be measured by size exclusion chromatography (SEC), e.g., gel permeation chromatography (GPC), among other techniques.

In one embodiment, a polymer product property is measured in-line and in response the ratio of the catalysts being combined is altered. In one embodiment, the molar ratio of the catalyst compound in the catalyst component slurry to the catalyst compound in the catalyst component solution, after the slurry and solution have been mixed to form the final catalyst composition, is 500:1 to 1:500, or 100:1 to 1:100, or 50:1 to 1:50 or 40:1 to 1:10. In another embodiment, the molar ratio of a Group 15 catalyst compound in the slurry to a ligand metallocene catalyst compound in the solution, after the slurry and solution have been mixed to form the catalyst composition, is 500:1, 100:1, 50:1, 10:1, or 5:1. The product property measured can include the dynamic shear viscosity, flow index, melt index, density, MWD, comonomer content, and combinations thereof. In another embodiment, when the ratio of the catalyst compounds is altered, the introduction rate of the catalyst composition to the reactor, or other process parameters, is altered to maintain a desired production rate.

Polymerization Process

The catalyst system can be used to polymerize one or more olefins to provide one or more polymer products therefrom. Any suitable polymerization process can be used, including, but not limited to, high pressure, solution, slurry, and/or gas phase polymerization processes. In embodiments that use other techniques besides gas phase polymerization, modifications to a catalyst addition system that are similar to those discussed with respect to FIG. 2 can be used. For example, a trim system may be used to feed catalyst to a loop slurry reactor for polyethylene copolymer production.

The terms "polyethylene" and "polyethylene copolymer" refer to a polymer having at least 50 wt. % ethylene-derived units. In various embodiments, the polyethylene can have at least 70 wt. % ethylene-derived units, at least 80 wt. % ethylene-derived units, at least 90 wt. % ethylene-derived units, or at least 95 wt. % ethylene-derived units. The polyethylene polymers described herein are generally copolymer, but may also include terpolymers, having one or more other monomeric units. As described herein, a polyethylene can include, for example, at least one or more other olefins or comonomers. Suitable comonomers can contain 3 to 16 carbon atoms, from 3 to 12 carbon atoms, from 4 to 10 carbon atoms, and from 4 to 8 carbon atoms. Examples of comonomers include, but are not limited to, propylene, 1-butene, 1-pentene, 1-hexene, 1-heptene, 1-octene, 4-methylpent-1-ene, 1-decene, 1-dodecene, 1-hexadecene, and the like.

Referring again to FIG. 2, the fluidized bed reactor 222 can include a reaction zone 232 and a velocity reduction zone 234. The reaction zone 232 can include a bed 236 that includes growing polymer particles, formed polymer particles and a minor amount of catalyst particles fluidized by the continuous flow of the gaseous monomer and diluent to remove heat of polymerization through the reaction zone. Optionally, some of the re-circulated gases 224 can be cooled and compressed to form liquids that increase the heat removal capacity of the circulating gas stream when readmitted to the reaction zone. A suitable rate of gas flow can be readily determined by experimentation. Make-up of gaseous monomer to the circulating gas stream can be at a rate equal to the rate at which particulate polymer product and monomer associated therewith is withdrawn from the reactor and the composition of the gas passing through the reactor can be adjusted to maintain an essentially steady state gaseous composition within the reaction zone. The gas leaving the reaction zone 232 can be passed to the velocity reduction zone 234 where entrained particles are removed, for example, by slowing and falling back to the reaction zone 232. If desired, finer entrained particles and dust can be removed in a separation system 238, such as a cyclone and/or fines filter. The gas 224 can be passed through a heat exchanger 240 where at least a portion of the heat of polymerization can be removed. The gas can then be compressed in a compressor 242 and returned to the reaction zone 232. Additional reactor details and means for operating the reactor 222 are described in, for example, U.S. Pat. Nos. 3,709,853; 4,003,712; 4,011,382; 4,302,566; 4,543,399; 4,882,400; 5,352,749; and 5,541,270; EP 0802202; and Belgian Patent No. 839,380.

The reactor temperature of the fluid bed process can be greater than about 30° C., about 40° C., about 50° C., about 90° C., about 100° C., about 110° C., about 120° C., about 150° C., or higher. In general, the reactor temperature is operated at the highest feasible temperature taking into account the sintering temperature of the polymer product within the reactor. Thus, the upper temperature limit in one embodiment is the melting temperature of the polyethylene copolymer produced in the reactor. However, higher temperatures may result in narrower MWDs, which can be improved by the addition of structure (IV), or other co-catalysts, as described herein.

Hydrogen gas can be used in olefin polymerization to control the final properties of the polyolefin, such as described in the "Polypropylene Handbook," at pages 76-78 (Hanser Publishers, 1996). Using certain catalyst systems, increasing concentrations (partial pressures) of hydrogen can increase the flow index (FI), or melt index (MI) of the polyethylene copolymer generated. The flow index can thus be influenced by the hydrogen concentration. The amount of hydrogen in the polymerization can be expressed as a mole ratio relative to the total polymerizable monomer, for example, ethylene, or a blend of ethylene and hexene or propylene.

The amount of hydrogen used in the polymerization process can be an amount necessary to achieve the desired flow index of the final polyolefin polymer. For example, the mole ratio of hydrogen to total monomer ($H_2$:monomer) can be greater than about 0.0001, greater than about 0.0005, or greater than about 0.001. Further, the mole ratio of hydrogen to total monomer (H$_2$:monomer) can be less than about 10, less than about 5, less than about 3, and less than about 0.10. A desirable range for the mole ratio of hydrogen to monomer can include any combination of any upper mole ratio limit with any lower mole ratio limit described herein. Expressed another way, the amount of hydrogen in the reactor at any time can range to up to about 5,000 ppm, up to about 4,000 ppm in another embodiment, up to about 3,000 ppm, or between about 50 ppm and 5,000 ppm, or between about 50 ppm and 2,000 ppm in another embodiment. The amount of hydrogen in the reactor can range from a low of about 1 ppm, about 50 ppm, or about 100 ppm to a high of about 400 ppm, about 800 ppm, about 1,000 ppm, about 1,500 ppm, or about 2,000 ppm, based on weight. Further, the ratio of hydrogen to total monomer (H$_2$:monomer) can be about 0.00001:1 to about 2:1, about 0.005:1 to about 1.5:1, or about 0.0001:1 to about 1:1. The one or more reactor pressures in a gas phase process (either single stage or two or more stages) can vary from 690 kPa (100 psig) to 3,448 kPa (500 psig), in the range from 1,379 kPa (200 psig) to 2,759 kPa (400 psig), or in the range from 1,724 kPa (250 psig) to 2,414 kPa (350 psig).

The gas phase reactor can be capable of producing from about 10 kg of polymer per hour (25 lbs/hr) to about 90,900 kg/hr (200,000 lbs/hr), or greater, and greater than about 455 kg/hr (1,000 lbs/hr), greater than about 4,540 kg/hr (10,000 lbs/hr), greater than about 11,300 kg/hr (25,000 lbs/hr), greater than about 15,900 kg/hr (35,000 lbs/hr), and greater than about 22,700 kg/hr (50,000 lbs/hr), and from about 29,000 kg/hr (65,000 lbs/hr) to about 45,500 kg/hr (100,000 lbs/hr).

As noted, a slurry polymerization process can also be used in embodiments. A slurry polymerization process generally uses pressures in the range of from about 101 kPa (1 atmosphere) to about 5,070 kPa (50 atmospheres) or greater, and temperatures in the range of from about 0° C. to about 120° C., and more particularly from about 30° C. to about 100° C. In a slurry polymerization, a suspension of solid, particulate polymer can be formed in a liquid polymerization diluent medium to which ethylene, comonomers, and hydrogen along with catalyst can be added. The suspension including diluent can be intermittently or continuously removed from the reactor where the volatile components are separated from the polymer and recycled, optionally after a distillation, to the reactor. The liquid diluent employed in the polymerization medium can be an alkane having from 3 to 7 carbon atoms, such as, for example, a branched alkane. The medium employed should be liquid under the conditions of polymerization and relatively inert. When a propane medium is used the process should be operated above the reaction diluent critical temperature and pressure. In one embodiment, a hexane, isopentane, or isobutane medium can be employed. The slurry can be circulated in a continuous loop system.

A number of tests can be used to compare resins from different sources, catalyst systems, and manufacturers. Such tests can include melt index, high load melt index, melt index ratio, density, dies swell, environmental stress crack resistance, and many others. Results of tests runs on resins made in embodiments described herein are presented in the examples section.

The product polyethylene can have a melt index ratio (MIR or I$_{21}$/I$_2$) ranging from about 10 to less than about 300, or, in many embodiments, from about 15 to about 150. Flow index (FI, HLMI, or I$_{21}$ can be measured in accordance with ASTM D1238 (190° C., 21.6 kg). The melt index (MI, I$_2$) can be measured in accordance with ASTM D1238 (at 190° C., 2.16 kg weight).

Density can be determined in accordance with ASTM D-792. Density is expressed as grams per cubic centimeter (g/cm$^3$) unless otherwise noted. The polyethylene can have a density ranging from a low of about 0.89 g/cm$^3$, about 0.90 g/cm$^3$, or about 0.91 g/cm$^3$ to a high of about 0.95 g/cm$^3$, about 0.96 g/cm$^3$, or about 0.97 g/cm$^3$. The polyethylene can have a bulk density, measured in accordance with ASTM D1895 method B, of from about 0.25 g/cm$^3$ to about 0.5 g/cm$^3$. For example, the bulk density of the polyethylene can range from a low of about 0.30 g/cm$^3$, about 0.32 g/cm$^3$, or about 0.33 g/cm$^3$ to a high of about 0.40 g/cm$^3$, about 0.44 g/cm$^3$, or about 0.48 g/cm$^3$.

Die swell measures the expansion of a polymer leaving a die. Die swell is measured using a Galaxy V capillary rheometer, with a die diameter of 1 mm and a die length of 20 mm. The temperature is set to 190° C. and a shear rate of 997.2 s$^{-1}$ is used. The time to extrude a strand 6 inches in length is measured. The reported result is an average of 10 runs.

Environmental stress crack resistance (ESCR) is measured by a bent strip test, using ASTM D1693 under Condition B. At condition B, a bent strip of the test resin is placed in a 10% Igepal® solution at 50° C. The strip is a plaque that is 75 mil+/−2.5 mil in thickness. A 0.012 inch notch is cut across the strip to create a stress point before immersion. The time to failure is measured.

Notched, constant ligament-stress (NCLS) tests were run to determine the slow-crack-growth resistance of the resins. The test is run under the conditions of ASTM F2136-01, on stamped 75 mil plaques. The pressure is 1200 psi, and the plaques is immersed in a 10% Igepal solution at 50° C. Time to failure is measured.

Tensile strength is measured under the conditions of ASTM D638, Type IV. The pull rate is 2 inches/min, and the stress is charted against length until failure. Tensile at yield is measured as the stress applied to the specimen at the point where the strain (length) starts to change.

Yellowness index is a technique for measuring numbers that correlate with visual estimates of perceived yellow color for specimens. It is measured on specimens of similar gloss, texture, thickness, and translucency. The test is performed under the conditions of ASTM E313.

The polyethylene can be suitable for such articles as films, fibers, nonwoven and/or woven fabrics, extruded articles, and/or molded articles. Examples of films include blown or cast films formed in single layer extrusion, coextrusion, or lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets. Examples of fibers include melt spinning, solution spinning and melt blown fiber operations for use in woven or non-woven form to make filters, diaper fabrics, hygiene products, medical garments, geotextiles, etc. Examples of extruded articles include tubing, medical tubing, wire and cable coatings, pipe, geomembranes, and pond liners. Examples of molded articles include single and multi-layered constructions by injection molding or rotation molding or blow molding processes in the form of bottles, tanks, large hollow articles, rigid food containers and toys, etc.

EXAMPLES

All reactions were carried out under a purified nitrogen atmosphere using standard glovebox, high vacuum or Schlenk techniques, unless otherwise noted. All solvents used were anhydrous, sparged with nitrogen and stored over 4 Å molecular sieves. All starting materials were either purchased from Aldrich and purified prior to use or prepared according to procedures known to those skilled in the art. $^1$H NMR spectroscopy on ligand and catalyst samples was performed at 250 MHz on a Bruker Avance DPX 250 instrument. Single-crystal X-ray diffraction was performed on a Rigaku SCX-Mini Diffractometer.

Syntheses

Ligands

The ligands that are made in embodiments are shown in Table 1. Table 1 also illustrates the abbreviations that are used for these ligands, herein. It can be noted that the number before the abbreviation, in this table and those that follow, is merely a numerical identifier of the structure, and has nothing to do with the structure of the ligand.

TABLE 1

NON ligands and abbreviations

1: NONMe

2: NON2

3: NON3

4: NON4

5: NON5

6: NONiPr

7: NONCl2

8: NONMeEt

9: NONEt2

10: NONiPr2

Representative Synthesis of 5: NON5 Ligand by Buchwald-Hartwig Palladium-Coupled Amination Reaction:

In a drybox, 2,3,4,5,6-pentamethylbromobenzene (750.0 mg, 3.30 mmol), 2,2'-oxydiethylamine dihydrochloride (295.3 mg, 1.67 mmol), sodium tert-butoxide (714.0 mg, 7.43 mmol), 3.0 mL of dimethyoxyethane, and 10.0 mM Pd(OAc)$_2$/CyPF-t-Bu (82.5 μL, 8.25×10$^{-4}$ mmol) were added to a 20 mL scintillation vial equipped with a magnetic stirbar and sealed with a cap containing a PTFE septum. The reaction was placed into a temperature controlled aluminum heating block and stirred at 100° C. for 6 h. After cooling to room temperature, the reaction mixture was partitioned between 100 mL H$_2$O/Et$_2$O (1:1), the organic phase separated and dried over MgSO$_4$, followed by the removal of all volatiles to afford 611 mg (93% yield) of the title compound. Ligands 1, 3, 4, 6, 7 and 9 were made in a similar fashion using either the Pd(OAc)$_2$/CyPF-t-Bu or Pd$_2$dba$_3$/rac-BINAP metal/ligand pairing.

$^1$H NMR data for 1: NONMe: δ (CD$_2$Cl$_2$): 7.13 (d, 2H, o-Ar), 7.10 (t, 2H, m-Ar), 6.67 (t, 2H, p-Ar), 6.63 (d, 2H, m-Ar), 3.92 (br s, 2H, NH), 3.77 (t, 4H, —CH$_2$), 3.38 (t, 4H, —CH$_2$), 2.14 (s, 6H, o-ArMe); 65% yield.

$^1$H NMR data for 3: NON3: δ (CD$_2$Cl$_2$): 6.84 (s, 4H, m-Ar), 3.61 (t, 4H, —CH$_2$), 3.49 (br s, 2H, NH), 3.15 (t, 4H, —CH$_2$), 2.28 (s, 12H, o-ArMe), 2.24 (s, 6H, p-ArMe); 91% yield.

¹H NMR data for 4: NON4: δ (CD₂Cl₂): 667 (s, 2H, p-Ar), 3.62 (t, 4H, —CH₂), 3.54 (br s, 2H, NH), 3.07 (t, 4H, —CH₂), 2.23 (s, 12H, o-ArMe), 2.18 (s, 12H, m-ArMe); 85% yield.

¹H NMR data for 5: NON5: δ (CD₂Cl₂): 3.67 (t, 4H, —CH₂), 3.53 (t, 2H, NH), 3.08 (t, 4H, —CH₂), 2.30 (s, 12H, o-ArMe), 2.24 (s, 12H, m-ArMe), 2.23 (s, 6H, p-ArMe); 93% yield.

¹H NMR data for 6: NONiPr: δ (CD₂Cl₂): 7.15 (d, 2H, o-Ar), 7.12 (t, 2H, m-Ar), 6.76 (t, 2H, p-Ar), 6.64 (d, 2H, m-Ar), 4.15 (br s, 2H, NH), 3.77 (t, 4H, —CH₂), 3.36 (t, 4H, —CH₂), 2.89 (sept, 2H, —CHMe₂), 1.26 (d, 12H, —CHMe₂); 81% yield.

¹H NMR data for 7: NONCl2: δ (CD₂Cl₂): 7.24 (d, 4H, m-Ar), 6.79 (t, 2H, p-Ar), 4.50 (t, 2H, NH), 3.60 (t, 4H, —CH₂), 3.53 (t, 4H, —CH₂); 80% yield.

¹H NMR data for 9: NONEt2: δ (CD₂Cl₂): 7.05 (d, 4H, m-Ar), 6.92 (t, 2H, p-Ar), 3.65 (t, 4H, —CH₂), 3.15 (t, 4H, —CH₂), 2.71 (q, 8H, —CH₂CH₃), 1.23 (t, 12H, —CH₂CH₃); 72% yield.

Representative Synthesis of 5: NON5 Ligand by Ditosylate Substitution Reaction

In a drybox, a slurry of (TsOCH₂CH₂)₂O (300 mg, 0.724 mmol) in diethyl ether was added to a slurry of 2,3,4,5,6-pentamethylanilide (245 mg, 1.45 mmol) in diethyl ether and stirred at room temperature for 24 hr. The cloudy yellow suspension was then filtered to give a clear diethyl ether solution. Removal of the solvent gave a white solid which was pumped on under vacuum to yield 5: NON5 (206 mg, 72% yield). Ligands 2, 8 and 10 were made in a similar manner.

¹H NMR data for 2: NON2: δ (C₆D₆): 6.97 (d, 4H, m-Ar), 6.87 (t, 2H, p-Ar), 3.50 (t, 2H, NH), 3.16 (t, 4H, —CH₂), 2.97 (t, 4H, —CH₂), 2.21 (s, 12H, o-ArMe); 62% yield.

¹H NMR data for 5: NON5: see above; 82% yield.

¹H NMR data for 8: NONMeEt: δ (C₆D₆): 7.05 (t, 2H, p-Ar), 6.97 and 6.93 (d, 4H, m-Ar), 3.58 (t, 2H, NH), 3.21 (t, 4H, —CH₂), 2.96 (t, 4H, —CH₂), 2.67 (q, 4H, —CH₂CH₃), 2.25 (s, 6H, o-ArMe), 1.15 (t, 6H, —CH₂CH₃); 46% yield.

¹H NMR data for 10: NONiPr2: δ (C₆D₆): 7.16 (d, 4H, m-Ar), 7.06 (t, 2H, p-Ar), 3.60 (t, 2H, NH), 3.56 (sept, 4H, —CHMe₂), 3.36 (t, 4H, —CH₂), 3.07 (t, 4H, —CH₂), 1.23 (d, 24H, —CHMe₂); 79% yield.

Catalysts

TABLE 2

NON zirconium dibenzyl catalysts and abbreviations

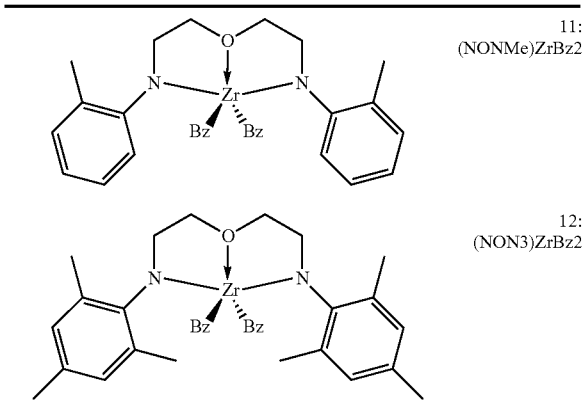

TABLE 2-continued

NON zirconium dibenzyl catalysts and abbreviations

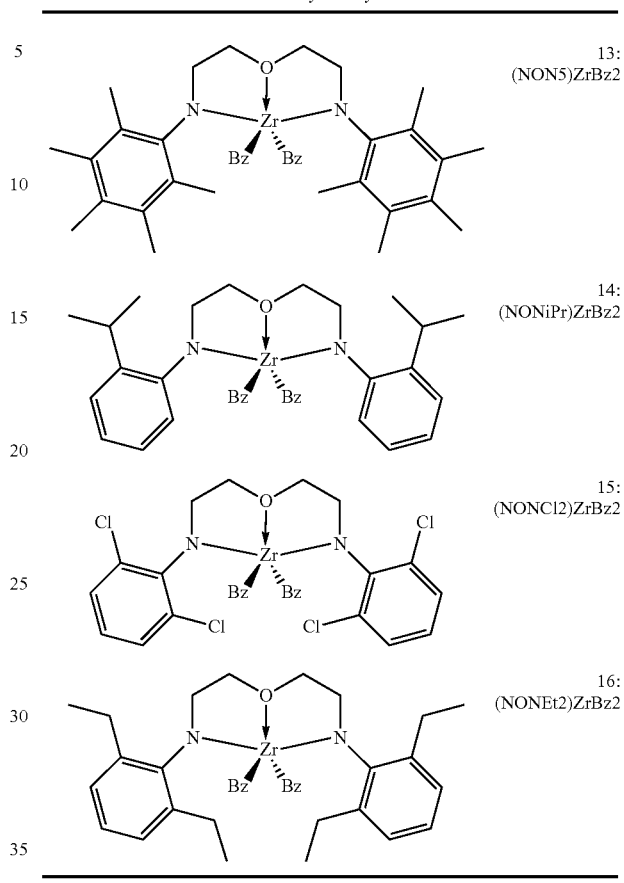

Representative Synthesis of 13: (NON5)ZrBn₂

A toluene solution of 5: NON5 (1.70 g, 4.29 mmol) was added to a toluene solution of ZrBn₄ (2.00 g, 4.39 mmol) and the mixture heated to 70° C., at which time a yellow precipitate formed. The mixture was heated overnight, after which time the reaction mixture was cooled, and the solid collected on a frit. The yellow solid was washed with pentane and the solid pumped on under vacuum to yield 2.51 g of pure 13: (NON5)ZrBn₂ (88% yield). Compounds 11, 12, 14, 15 and 16 were synthesized in a similar fashion.

¹H NMR data for 11: (NONMe)ZrBn₂: δ (CD₂Cl₂): 7.25 (d, 2H, o-Ar), 7.21 (t, 2H, m-Ar), 7.20 (t, 2H, benzyl p-Ar), 7.16 (t, 2H, o-Ar), 6.93 (t, 4H, benzyl m-Ar), 6.80 (d, 2H, m-Ar), 6.01 (br s, 4H, benzyl o-Ar), 3.83 (t, 4H, —CH₂), 3.59 (t, 4H, —CH₂), 2.34 (s, 6H, o-ArMe), 1.42 (s, 4H, —CH₂Ph); 66% yield.

¹H NMR data for 12: (NON3)ZrBn₂: δ (C₆D₆): 7.08 (t, 4H, benzyl m-Ar), 6.93 (t, 2H, benzyl p-Ar), 6.92 (s, 4H, m-Ar), 6.54 (d, 4H, benzyl o-Ar), 3.46 (t, 4H, —CH₂), 3.21 (t, 4H, —CH₂), 2.41 (s, 12H, o-ArMe), 2.02 (s, 6H, p-ArMe), 1.54 (s, 4H, —CH₂Ph); 92% yield.

¹H NMR data for 13: (NON5)ZrBn₂: δ (C₆D₆): 7.10 (t, 4H, m-Ar), 6.92 (t, 2H, p-Ar), 6.52 (d, 4H, o-Ar), 3.39 (t, 4H, —CH₂), 3.26 (t, 4H, —CH₂), 2.45 (s, 12H, o-ArMe), 2.17 (s, 12H, m-ArMe), 2.08 (s, 6H, p-ArMe), 1.49 (s, 4H, —CH₂Ph); 88% yield.

Figure 4:
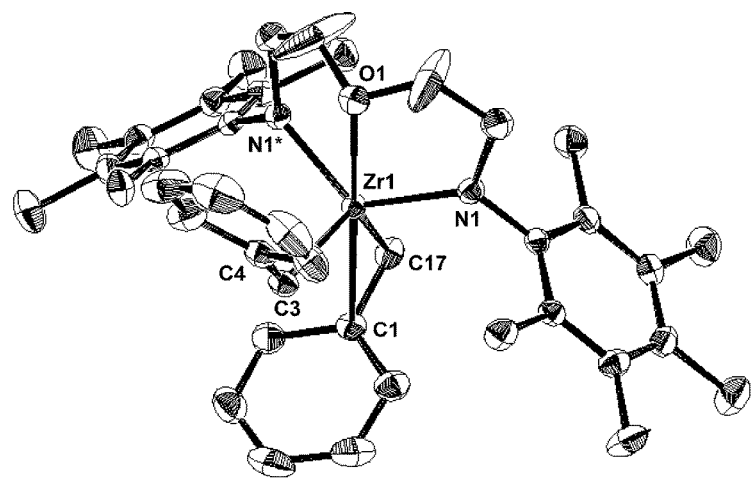
FIG 4 is an X-ray crystallographic structure for 13: (NON5)ZrBn2, according to the present disclosure.

An X-ray crystallographic structure for 13: (NON5)ZrBn₂ is shown in FIG. 4.

$^1$H NMR data for 14: (NONiPr)ZrBn$_2$: δ (CD$_2$Cl$_2$): 7.38 (d, 4H, benzyl m-Ar), 7.22 (t, 2H, benzyl p-Ar), 7.17 (d, 4H, benzyl o-Ar), 7.10-6.70 (m, 8H, o,m,p-Ar), 3.88 (t, 4H, —CH$_2$), 3.51 (sept, 2H, —CHMe$_2$), 3.35 (t, 4H, —CH$_2$), 1.50 (s, 4H, —CH$_2$Ph), 1.25 (d, 12H, —CHMe$_2$); 40% yield.

$^1$H NMR data for 15: (NONCl2)ZrBn$_2$: δ (CD$_2$Cl$_2$): 7.24 (t, 2H, p-Ar), 7.18 (d, 4H, m-Ar), 7.07 (t, 4H, benzyl m-Ar), 7.05 (t, 2H, benzyl p-Ar), 6.43 (d, 4H, benzyl o-Ar), 3.94 (t, 4H, —CH$_2$), 3.52 (t, 4H, —CH$_2$), 1.51 (s, 4H, —CH$_2$Ph); 72% yield.

$^1$H NMR data for 16: (NONEt2)ZrBn$_2$: δ (CD$_2$Cl$_2$): 7.18 (t, 4H, benzyl m-Ar), 7.11 (t, 2H, benzyl p-Ar), 7.03 (d, 4H, m-Ar), 6.88 (t, 2H, p-Ar), 6.19 (br s, 4H, benzyl o-Ar), 3.98 (t, 4H, —CH$_2$), 3.52 (t, 4H, —CH$_2$), 2.88 and 2.76 (q, 8H, —CH$_2$CH$_3$), 1.70 (br s, 4H, —CH$_2$Ph), 1.28 (t, 12H, —CH$_2$CH$_3$); 70% yield.

TABLE 3

NON zirconium dichloro compounds and abbreviations

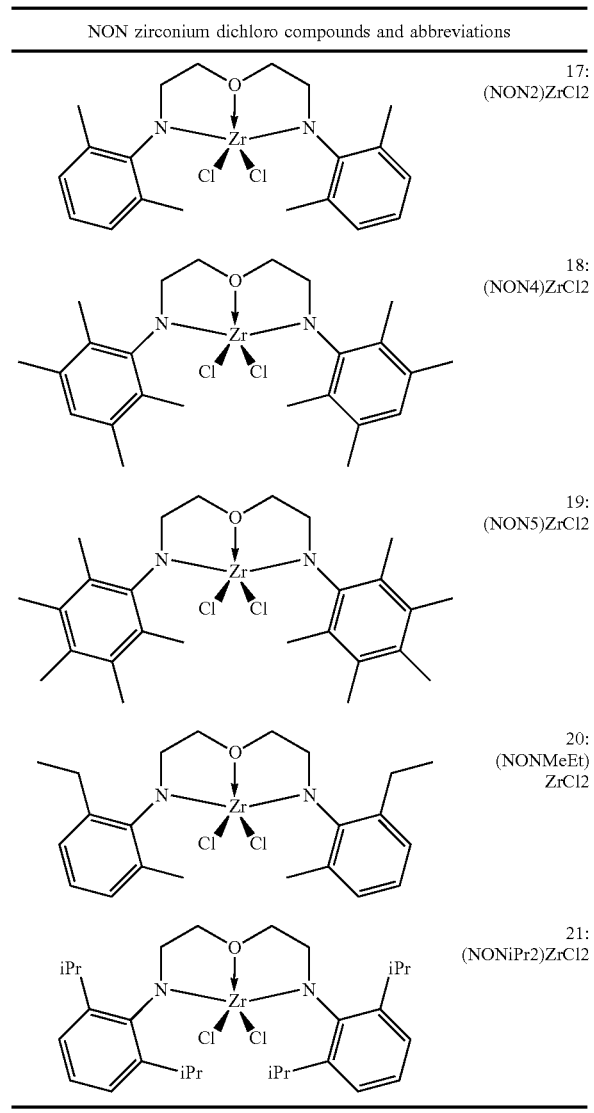

17: (NON2)ZrCl2

18: (NON4)ZrCl2

19: (NON5)ZrCl2

20: (NONMeEt)ZrCl2

21: (NONiPr2)ZrCl2

Representative Synthesis of 19: (NON5)ZrCl$_2$

Solid ZrCl$_2$(NMe$_2$)$_2$(DME) (850 mg, 2.50 mmol) was added to a toluene solution of 5: NON5 (1.00 g, 2.52 mmol) and the resultant brown mixture heated to 70° C. overnight. The mixture was then heated to 95° C. for 2 hours to drive off any liberated HNMe$_2$. The solvent was then removed under vacuum to yield a brown oil. The residue was washed with pentane to generate a yellow solid (1.13 g, 80% yield). Compounds 17, 18, 20 and 21 were synthesized in a similar fashion.

$^1$H NMR data for 17: (NON2)ZrCl$_2$: δ (CD$_2$Cl$_2$): 7.09 (d, 4H, m-Ar), 6.98 (t, 2H, p-Ar), 4.60 (t, 4H, —CH$_2$), 3.74 (t, 4H, —CH$_2$), 2.41 (s, 12H, o-ArMe); 98% yield.

$^1$H NMR data for 18: (NON4)ZrCl$_2$: δ (CD$_2$Cl$_2$): 6.83 (s, 2H, p-Ar), 4.60 (t, 4H, —CH$_2$), 3.67 (t, 4H, —CH$_2$), 2.30 (s, 12H, o-ArMe), 2.27 (s, 12H, m-ArMe); 62% yield.

$^1$H NMR data for 19: (NON5)ZrCl$_2$: δ (CD$_2$Cl$_2$): 4.57 (t, 4H, —CH$_2$), 3.65 (t, 4H, —CH$_2$), 2.35 (s, 12H, o-ArMe), 2.26 (s, 6H, p-ArMe), 2.24 (s, 12H, m-ArMe); 80% yield.

$^1$H NMR data for 20: (NONMeEt)ZrCl$_2$: δ (CD$_2$Cl$_2$): 7.19 (t, 2H, p-Ar), 7.03 (d, 4H, m-Ar), 4.59 (t, 4H, —CH$_2$), 3.77 (t, 4H, —CH$_2$), 2.88 (q, 4H, —CH$_2$CH$_3$), 2.42 (s, 6H, o-ArMe), 1.28 (t, 6H, —CH$_2$CH$_3$); 69% yield.

$^1$H NMR data for 21: (NONiPr2)ZrCl$_2$: δ (CD$_2$Cl$_2$): 7.24 (d, 4H, m-Ar), 7.14 (t, 2H, p-Ar), 4.60 (t, 4H, —CH$_2$), 3.78 (t, 4H, —CH$_2$), 3.53 (sept, 4H, —CHMe$_2$), 1.28 and 1.23 (d, 24H, —CHMe$_2$); 71% yield.

Catalyst Testing—High Throughput Experimentation

Ethylene/1-octene copolymerizations were carried out in a parallel pressure reactor, which is described in U.S. Pat. Nos. 6,306,658, 6,455,316 and 6,489,1681; WO 00/09255; and Murphy et al., J. Am. Chem. Soc., 2003, 125, 4306-4317. A pre-weighed glass vial insert and disposable stirring paddle were fitted to each reaction vessel of the reactor, which contains 48 individual reaction vessels. The reactor was then closed and each vessel was individually heated to a set temperature (usually 85 and/or 100° C.) and pressurized to a pre-determined pressure of ethylene (generally 135 psi). 100 uL of 1-octene (637 umol) was injected into each reaction vessel. 500 equivalents of MAO were then introduced to each cell to act as a co-catalyst/scavenger. The contents of the vessel were then stirred at 800 rpm. A toluene solution of catalyst (20 nmol) was then added and the volume of the cell made up to 5 mL with isohexane. All runs were performed in triplicate. The reaction was then allowed to proceed until a set time limit (usually 30 min) or until a set amount of ethylene had been taken up by the reaction (ethylene pressure was maintained in each reaction vessel at the pre-set level by computer control). At this point, the reaction was quenched by exposure to air. After the polymerization reaction, the glass vial insert containing the polymer product and solvent was removed from the pressure cell and the inert atmosphere glovebox and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight, by FT-IR (see below) to determine comonomer incorporation, and by DSC (see below) to determine melting point.

High temperature size exclusion chromatography was performed using an automated "Rapid GPC" system as described in U.S. Pat. Nos. 6,491,816, 6,491,823, 6,475,391, 6,461,515, 6,436,292, 6,406,632, 6,175,409, 6,454,947, 6,260,407, and 6,294,388. This apparatus has a series of three 30 cm×7.5 mm linear columns, each containing PLgel 10 um, Mix B. The GPC system was calibrated using polystyrene standards ranging from 580-3,390,000 g/mol. The system was operated at an eluent flow rate of 2.0 mL/min and an oven temperature of 165° C. 1,2,4-trichlorobenzene was used as the eluent. The polymer samples were dissolved in 1,2,4-trichlorobenzene at a concentration of 0.1-0.9 mg/mL. 250 uL of a polymer solution were injected into the system. The concentration of the polymer in the eluent was monitored using an evaporative light scattering detector. The molecular weights obtained are relative to linear polystyrene standards.

Differential Scanning calorimetry (DSC) measurements were performed on a TA-Q100 instrument to determine the melting point of the polymers. Samples were pre-annealed at 220° C. for 15 minutes and then allowed to cool to room temperature overnight. The samples were then heated to 220° C. at a rate of 100° C./min and then cooled at a rate of 50° C./min. Melting points were collected during the heating period.

The ratio of 1-octene to ethylene incorporated in the polymers (weight %) was determined by rapid FT-IR spectroscopy on a Bruker Equinox 55+IR in reflection mode. Samples were prepared in a thin film format by evaporative deposition techniques. Weight % 1-octene was obtained from the ratio of peak heights at 1378 and 4322 cm$^{-1}$. This method was calibrated using a set of ethylene/1-octene copolymers with a range of known wt. % 1-octene content.

Preparation of Silica Supported Catalysts 40 g of Ineous ES-757 silica gel (calcined at 600° C.) was slurried in 125 mL toluene and reacted with 47 g MAO (Albemarle, 30 wt %) at room temperature for 2 hrs. The SMAO was then filtered through a glass frit and washed with hexane. Drying under vacuum for 1 to 2 hrs yielded 54 g of dry free-flowing SMAO. Supported versions of NON catalysts were made by adding toluene solutions of the catalyst to toluene slurries of SMAO for one hour. The solid was collected on a frit and dried under vacuum resulting in an off-white solid. Catalyst loadings were kept constant at 37 umol/g, corresponding to a Al:Zr ratio of 130.

TABLE 4

Activity, Molecular Weight, PDI and Comonomer Incorporation Results from High Throughput Catalyst Testing

| Catalyst | Activity (g/mmol/ h/bar) | MW (kDa) | PDI (Mw/Mn) | Comonomer Incorporation. (wt %) |
| --- | --- | --- | --- | --- |
| 11: (NONMe)ZrBn$_2$ | 19,700 | 170 | 1.6 | 0.8 |
| 12: (NON3)ZrBn$_2$ | 25,500 | 141 | 1.8 | 4.2 |
| 13: (NON5)ZrBn$_2$ | 69,700 | 93 | 1.5 | 6.0 |
| 14: (NONiPr1)ZrBn$_2$ | 13,200 | 109 | 1.9 | 2.4 |
| 15: (NONCl2)ZrBn$_2$ | 10 | ND | ND | ND |
| 16: (NONEt2)ZrBn$_2$ | 23,500 | 110 | 1.5 | 0.9 |
| 17: (NON2)ZrCl$_2$ | 11,000 | 111 | 1.5 | 3.8 |
| 18: (NON4)ZrCl$_2$ | 32,000 | 75 | 1.4 | 4.1 |
| 19: (NON5)ZrCl$_2$ | 36,800 | 96 | 1.4 | 4.7 |
| 20: (NONMeEt)ZrCl$_2$ | 15,800 | 103 | 1.5 | 2.8 |
| 21: (NONiPr2)ZrCl$_2$ | 21,400 | 89 | 1.5 | 2.5 |

Catalyst Testing—Gas Phase Lab Reactor

The gas phase reactor employed was a 1.65 liter, stainless steel autoclave equipped with a variable speed mechanical agitator. In a standard HDPE run, the reactor was first charged with 200 g of NaCl (pre-dried at 150° C. under vacuum for 2 days) and dried by heating at 85° C. under a stream of nitrogen for a minimum of 1 hour. After baking out the reactor, the temperature was lowered to 80° C. to introduce 5 g of SMAO (silica supported methylaluminoxane) as a scavenger with help of nitrogen pressure. After adding SMAO, the reactor was sealed and components were gently stirred. This was then charged with hydrogen (1600 ppm) and 1-hexene (C6/C2=0.004). The reactor was then pressurized with 130 psi of ethylene. Once the system reached a steady state, catalyst was charged into the reactor using a stainless steel bomb to start polymerization. The reactor temperature was then brought up to 100° C. and maintain at this temperature throughout the run. The polymerization was typically carried for 60 minutes and during this time the hydrogen, C6/C2 ratio and ethylene pressure remained constant. At the end of 60 minutes, the reactor was cooled down, vented, and opened. The resulting mixture was then washed with water, methanol and dried.

TABLE 5

Activity, Molecular Weight, PDI and Comonomer Incorporation Results from Lab Reactor Testing of Supported Catalysts

| Supported Catalyst | Activity (g polymer/g supported cat) | MW (kDa) | PDI (Mw/ Mn) | Comonomer Incorporation. (wt %) |
| --- | --- | --- | --- | --- |
| 11: (NONMe)ZrBn$_2$ | 120 | 788 | 15.23 | 2.3 |
| 12: (NON3)ZrBn$_2$ | 190 | 621 | 10.23 | 2.4 |
| 13: (NON5)ZrBn$_2$ | 1080 | 609 | 15.87 | 2.2 |
| 14: (NONiPr1)ZrBn$_2$ | 260 | 845 | 9.15 | 1.8 |
| 16: (NONEt2)ZrBn$_2$ | 420 | 778 | 10.60 | 2.3 |
| 18: (NON4)ZrCl$_2$ | 140 | 520 | 8.92 | 2.4 |
| 19: (NON5)ZrCl$_2$ | 620 | 630 | 15.83 | 4.1 |
| 20: (NONMeEt)ZrCl$_2$ | 100 | 528 | 10.91 | 2.5 |
| 21: (NONiPr)ZrCl$_2$ | 60 | 392 | 8.17 | 1.6 |

Molecular weight distribution was characterized using a High Temperature Size Exclusion Chromatograph (Waters-Alliance GPCV 2000) equipped with a differential refractive index detector (DRI). Three Polymer Laboratories PLgel 10 mm Mixed-B columns were used. The nominal flow rate was 1.0 mL/min, and the nominal injection volume was 300 uL. The various transfer lines, columns and differential refractometer (the DRI detector) were contained in an oven maintained at 145° C. Polymer solutions were prepared by dissolving the desired amount of dry polymer in the appropriate volume of 1,2,4-trichlorobenzene to yield concentrations ranging from 0.25 to 1.5 mg/mL. The sample mixtures were heated at 160° C. with continuous agitation for ~2 hours. The solution was filtered through a 2 micron stainless steel filter (Polymer Labs) into scintillation vials using a Polymer Labs SP260 Sample Prep Station. The separation efficiency of the column set was calibrated using a series of narrow MWD polystyrene standards (Polymer Laboratories), which reflects the expected MW range for samples and the exclusion limits of the column set. Seventeen individual polystyrene standards, ranging from Mp~580 to 10,000,000, were used to generate the calibration curve. Some GPC's were also obtained on a Polymer Labs PL220 Gel Permeation Chromatograph operating at 160° C. to accommodate higher molecular weight samples.

Preparation of Spray Dried 13: (NON5)ZrBn$_2$

13: (NON5)ZrBn$_2$, MAO (neat), toluene and fumed silica (Cabosil TS-610) were mixed in the ratios and amounts listed in Table 6. The mixture was introduced into an atomizing device, producing droplets that were contacted with a gas stream to evaporate the liquid, thereby forming a white powder. ~63 g of catalyst was supplied which was enough to make 1944 g of spray dried catalyst. The final Zr loading was determined to be 44.96 umol/g with an Al/Zr ratio of 135.

TABLE 6

Conditions for the Preparation of Spray Dried 13: (NON5)ZrBn$_2$

| | |
|---|---|
| Amount of master feed stock solution (lb) | 56 |
| Cabosil (lb) | 3.0 |
| MAO (neat) (lb) | 2.2 |
| Toluene (lb) | 50.8 |
| 13: (NON5)ZrBn$_2$ (g) | 63.1 |
| Theoretical yield (g) | 2405 |
| Actual yield (g) | 1944 |
| Recovery (%) | 81 |
| Amount of spray dried catalyst collected (lb) | 3.9 |
| Atomizer speed (%) | 90 |
| Slurry feed rate (lb/h) | 90 |
| Outlet temperature (° C.) | 89.8 |
| Theoretical Al loading (wt %) | 19 |
| Theoretical Zr loading (wt %) | 0.36 |
| Actual Al loading (wt %) | 16.3 |
| Actual Zr loading (wt %) | 0.41 |
| Al loading (mmol/g) | 6.0 |
| Zr loading (umol/g) | 44.96 |
| Al/Zr ratio | 135 |
| Toluene (wt %) | 3.5 |

Preparation of Spray Dried Tri-Component Bis(n-butyl cyclopentadienyl)zirconium dichloride/{[(2,3,4,5,6-Me$_5$C$_6$)NCH$_2$CH$_2$]$_2$NH}ZrBn$_2$/13: (NON5)ZrBn$_2$ Catalysts The tri-component catalyst formulations used to produce the resin was prepared by mixing bis(n-butyl cyclopentadienyl)zirconium dichloride, {[(2,3,4,5,6-Me$_5$C$_6$)NCH$_2$CH$_2$]$_2$NH}ZrBn$_2$, (NON5)ZrBn$_2$, MAO (10 wt % solution), toluene and fumed silica (Cabosil TS-610) in the ratios and amounts listed in Table 5. The mixture was introduced into an atomizing device, producing droplets that were contacted with a gas stream to evaporate the liquid, thereby forming a white powder. The resulting white powder was then mixed with hydrobrite 380 PO white mineral oil purchased from Sonneborn and hexane to obtain a catalyst slurry that contained 22 wt % catalyst.

TABLE 7

Productivity and Molecular Weight Data for Lab Reactor Testing of Spray-Dried 13: (NON5)ZrBn$_2$

| Catalyst | Loading (mmol/g) | Yield (g) | Productivity (g/g) | Activity (g/mmol) | Mw (kDa) | Mn (kDa) | PDI (Mw/Mn) | I$_{21}$ (g/10 min) | MFR (I$_{21}$/I$_5$) |
|---|---|---|---|---|---|---|---|---|---|
| 13: (NON5)ZrBn$_2$ | 0.045 | 66.1 | 7032 | 156300 | 530 | 41 | 12.77 | 0.78 | 81.0 |

TABLE 8

Data for Spray Dried Tri-Component Catalyst Formulations

| Catalyst description | Met/HN5/NON5 1:4.5:1 | Met/HN5/NON5 1:3.5:2 |
|---|---|---|
| Cabosil (lb) | 3.4 | 3.4 |
| MAO (10 wt %) (lb) | 24.7 | 24.7 |
| Toluene (lb) | 36.0 | 36.0 |
| bis(n-butyl cyclopentadienyl)zirconium dichloride (g) | 8.5 | 8.5 |
| {[(2,3,4,5,6-Me$_5$C$_6$)NCH$_2$CH$_2$]$_2$NH}ZrBn$_2$ (g) | 62.9 | 48.9 |
| 13: (NON5)ZrBn$_2$ (g) | 14.0 | 28.0 |
| Theoretical yield (g) | 2750 | 2750 |
| Actual yield (g) | 2478 | 2610 |
| Recovery (%) | 90 | 95 |
| Amount of spray dried catalyst collected (lb) | 4.21 | 4.60 |
| Atomizer speed (%) | 90 | 90 |
| Slurry feed rate (lb/h) | 94.2 | 94.2 |
| Outlet temperature (° C.) | 79.9 | 79.9 |
| Theoretical Al loading (wt %) | 19.0 | 19.0 |
| Theoretical Zr loading (wt %) | 0.45 | 0.45 |

Product Evaluation

General

Large part blow molding (LPBM) describes a market for blow molded containers from about 8 to 220 liters. Typical applications include chemical containers, trash containers, gasoline tanks, and shipping drums. These products require exceptional environmental stress crack resistance (ESCR), high stiffness, and toughness. Resins must also offer high melt strength to maintain parison stability during the blow molding process.

As with many other resins, those for LPBM must also balance product performance with resin processability. A resin that delivers high ESCR, but is considered too difficult to process will struggle commercially. Processibility of blow molded resins is related to the shape of the parison, or the extruded molten polymer after it leaves the die and before the molds close. Parison shape can be important for proper bottle formation and processing. Parison shape can be impacted by swell, gravity, also referred to as sag, and geometry of the die and mandrel tooling. The parison shape is subject to change in the time period between die exit and closure of the molds. Swell is the result of the relaxation of the polymer melt upon exiting the die (elastic recovery of stored energy in the melt). Typically two types of die swell are observed: diameter swell and wall thickness swell. Diameter swell occurs immediately after exiting the die and is the increase in parison diameter over that of the die. Wall thickness swell is the increase in the thickness of the parison walls. There are many different types of blow molding machines and each subjects the molten polymer to different levels of shear forces, pressure, and orientation. As a result, predicting parison shape is quite complicated. On a laboratory scale, swell tests are performed in order to predict the shape of the parison. Unfortunately, there is not an absolute swell test beyond running the resin on the intended blow molding machine. Therefore, multiple swell tests are run to learn as much as possible about parison behavior. Evaluation of resins made using the catalyst blends disclosed herein showed results for blow molding of large parts that were comparable to commercial resins, e.g., giving results for die-swell that were within five percent, ten percent, or twenty percent of values achieved for current commercial resins.

Another important balance for blow molded resins is between stiffness and toughness. These two attributes are inversely related to density. A higher density resin will deliver higher stiffness, but lower ESCR. Alternatively, a lower density resin will deliver lower stiffness and higher ESCR. The goal is to design a resin that offers both excellent ESCR and stiffness such that the large part can be light-weighted.

Results

The new tri-component resins were evaluated in the lab for resin characteristics, product performance, and processibility. Evaluation of resins made using the catalyst blends disclosed herein showed results for blow molding of large parts that were comparable to commercial resins, e.g., giving results for die-swell that were within five percent, ten percent, or twenty percent of values achieved for current commercial resins.

Additional swell tests were also performed–% die swell. The results are listed in Table 9 below. The competitive unimodal resin exhibits higher % die swell than the two component resins. Bimodal resins typically experience less swell than unimodal resins.

TABLE 9

Results from Resin tests

| Manufacturer | | Total | Univation | Univation | Univation | Univation |
|---|---|---|---|---|---|---|
| Grade | | Total 54050 | BMC-BM | BMLP BM | Part 10 | Part 13 | Part 14 |
| Catalyst | | | HN5/B | HN5/B | 4.5/1/1 HN5/NON5/B | 3.5/2/1 HN5/NON5/B |
| H2/C2 Ratio | | | 0.0009 | 0.0009 | 0.0009 | 0.0009 |
| FI, I21 | g/10 min | 5.3 | 5.9 | 5.4 | 5.7 | 6.3 |
| MI, I5 | g/10 min | 0.20 | 0.13 | 0.10 | 0.12 | 0.15 |
| MI, I2 | g/10 min | 0.035 | 0.018 | 0.013 | 0.018 | 0.019 |
| MFR, I21/I2 | | 152 | 331 | 421 | 313 | 326 |
| MFR, I21/I5 | | 26.6 | 47.3 | 53.9 | 45.6 | 43.0 |
| Density | g/cc | 0.9552 | 0.9537 | 0.9540 | 0.9543 | 0.9547 |
| Galaxy Swell, Sec | | | | | | |
| % Die Swell | | 94.5 | 65.1 | 61.8 | 65.1 | 74.2 |
| ESCR, 10% Igepal ® | hr | 531 | no fail 42 days | no fail 42 days | no fail 42 days | no fail 42 days |
| nCLS1, 1200 psi | hr | 10.2 | 9.9 | 11 | 11.3 | 11.9 |
| Tensile at Yield | psi | 3920 | 3817 | 3844 | 3946 | 3936 |
| Izod Impact Test, Notched at 23 C | ft-lb/in | 12.9 | 17.1 | 16.7 | 17.8 | 16.0 |
| Yellowness Index | | −2.35 | −1.75 | −4.98 | −5.97 | −5.83 |
| SEC-MWD (Mw/Mn) | | 20.23 | 34.58 | 20.77 | 20.03 | 16.86 |

Table 9 also includes other property results for the competitive resin, HN5/B standard formulations, and the tri-component resins HN5/B/NON5. Plaque property test results suggest the tri-component resins exhibit improved Bent Strip ESCR and Izod Impact Strength, as well as similar color, tensile, and density to commercial resin Total 54050.

These results show that by doping a small amount of a third component, NON5, into a standard HN5/B formulation, it is possible to produce large part blow-molded items with properties that are competitive with those already in the marketplace.

All numerical values are "about" or "approximately" the indicated value, and take into account experimental error and variations that would be expected by a person having ordinary skill in the art. Further, various terms have been defined above. To the extent a term used in a claim is not defined above, it should be given the broadest definition persons in the pertinent art have given that term as reflected in at least one printed publication or issued patent. All patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A polymerization catalyst system, comprising at least three catalysts, comprising:
   a metallocene catalyst;
   a first non-metallocene comprising a ligand complexed to a metal through two or more nitrogen atoms; and
   a second non-metallocene comprising a catalyst of the formula:

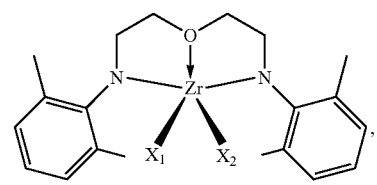

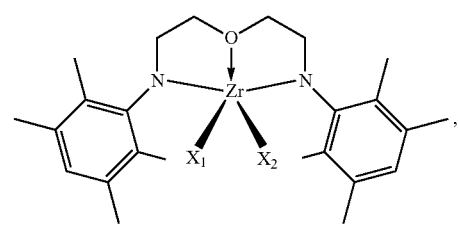

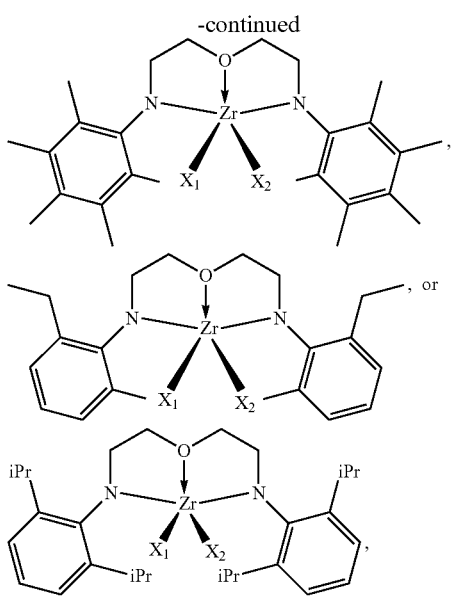

or any combinations, wherein $X_1$ and $X_2$ are each, independently, phenyl, methyl, chloro, fluoro, or a hydrocarbyl group.

2. The polymerization catalyst system of claim 1, comprising bis(n-butylcyclopentadienyl) zirconium$(X)_2$, wherein each X is, independently, phenyl, methyl, chloro, fluoro, or a hydrocarbyl group.

3. The polymerization catalyst system of claim 1, comprising bis(n-propylcyclopentadienyl, tetramethylcyclopentadienyl) zirconium$(X)_2$, wherein each X is, independently, phenyl, methyl, chloro, fluoro, or a hydrocarbyl group.

4. The polymerization catalyst system of claim 1, comprising [(pentamethylbenzylNCH$_2$)$_2$NH]Zr$(X)_2$, wherein each X is, independently, phenyl, methyl, chloro, fluoro, or a hydrocarbyl group.

5. The polymerization catalyst system of claim 1, comprising a catalyst of the formula:

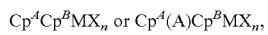

wherein M is a Group 4, 5, or 6 atom; $Cp^A$ and $Cp^B$ are each bound to M and are independently selected from the group consisting of cyclopentadienyl ligands, substituted cyclopentadienyl ligands, ligands isolobal to cyclopentadienyl and substituted ligands isolobal to cyclopentadienyl; (A) is a divalent bridging group bound to both $Cp^A$ and $Cp^B$ selected from the group consisting of divalent $C_1$ to $C_{20}$ hydrocarbyls and $C_1$ to $C_{20}$ heteroatom containing hydrocarbonyls, wherein the heteroatom containing hydrocarbonyls comprise from one to three heteroatoms; X is a leaving group selected from the group consisting of chloride ions, bromide ions, $C_1$ to $C_{10}$ alkyls, and $C_2$ to $C_{12}$ alkenyls, carboxylates, acetylacetonates, and alkoxides; and n is an integer from 1 to 3.

6. The polymerization catalyst system of claim 1, comprising a catalyst of the formula:

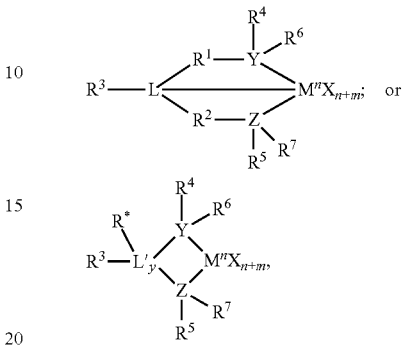

wherein M is a Group 3 to 12 transition metal or a Group 13 or 14 main group metal; each X is independently an anionic leaving group; y is 0 or 1; n is the oxidation state of M; m is the formal charge of the ligand represented by YZL or YZL'; L is a Group 15 or 16 element; L' is a group 15 or 16 element or Group 14 containing group; Y is a Group 15 element; Z is a Group 15 element; le and $R^2$ are independently a $C_1$ to $C_{20}$ hydrocarbon group, a heteroatom containing group having up to twenty carbon atoms, silicon, germanium, tin, lead, or phosphorus; $R^1$ and $R^2$ may be interconnected to each other; $R^3$ is absent, a hydrocarbon group, hydrogen, a halogen, or a heteroatom containing group; $R^4$ and $R^5$ are independently an alky group, an aryl group, a substituted aryl group, a cyclic alkyl group, a substituted cyclic alkyl group, a cyclic aralkyl group, a substituted cyclic aralkyl group, or a multiple ring system; $R^4$ and $R^5$ may be interconnected to each other; $R^6$ and $R^7$ are independently absent, hydrogen, an alkyl group, a halogen, a heteroatom, or a hydrocarbyl group; and $R^*$ is absent, hydrogen, a Group 14 atom containing group, a halogen, or a heteroatom containing group.

7. The polymerization catalyst system of claim 1, wherein the three catalysts are co-supported on a single support.

8. The polymerization catalyst of claim 1, wherein the first non metallocene catalyst and the second non metallocene catalyst are co-supported on a single support, and at least a portion of the metallocene catalyst is added as a trim feed to the support.

9. The polymerization catalyst system of claim 1, comprising a slurry mixture.

* * * * *